United States Patent
He et al.

(10) Patent No.: US 12,075,492 B2
(45) Date of Patent: Aug. 27, 2024

(54) SYSTEM AND METHOD FOR PRIORITIZATION OF RANDOM ACCESS PROCEDURES

(71) Applicant: QUALCOMM Incorporated, San Diego, CA (US)

(72) Inventors: Linhai He, San Diego, CA (US); Ruiming Zheng, Beijing (CN); Jing Lei, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 510 days.

(21) Appl. No.: 17/310,448

(22) PCT Filed: Feb. 13, 2020

(86) PCT No.: PCT/CN2020/075070
§ 371 (c)(1),
(2) Date: Aug. 3, 2021

(87) PCT Pub. No.: WO2020/164540
PCT Pub. Date: Aug. 20, 2020

(65) Prior Publication Data
US 2022/0167399 A1    May 26, 2022

(30) Foreign Application Priority Data
Feb. 14, 2019  (WO) ............... PCT/CN2019/075028

(51) Int. Cl.
*H04W 74/0833*  (2024.01)
*H04B 7/06*  (2006.01)
(Continued)

(52) U.S. Cl.
CPC ........ *H04W 74/085* (2013.01); *H04B 7/0695* (2013.01); *H04W 36/08* (2013.01); *H04W 52/36* (2013.01); *H04W 76/19* (2018.02)

(58) Field of Classification Search
CPC ... H04W 74/085; H04W 36/08; H04W 52/36; H04W 76/19; H04W 74/0833; H04W 74/004; H04B 7/0695
(Continued)

(56) References Cited

U.S. PATENT DOCUMENTS

2013/0242730 A1  9/2013  Pelletier et al.
2016/0381713 A1  12/2016  Hwang
(Continued)

FOREIGN PATENT DOCUMENTS

WO    2016161647 A1   10/2016
WO    2018204922 A1   11/2018

OTHER PUBLICATIONS

CATT: "Considerations on Priority Access", 3GPP TSG-RAN WG2 #99, R2-1707926, 3rd Generation Partnership Project (3GPP), Mobile Competence Centre, 650, Route Des Lucioles, F-06921 Sophia-Antipolis Cedex, France, vol. RAN WG2, No. Berlin, Germany, Aug. 21, 2017-Aug. 25, 2017, Aug. 20, 2017 (Aug. 20, 2017), XP051317860, 4 Pages, Section 2.2, p. 2-p. 3.
(Continued)

*Primary Examiner* — Kwang B Yao
*Assistant Examiner* — Syed M Bokhari
(74) *Attorney, Agent, or Firm* — Arent Fox, LLP

(57) ABSTRACT

In an aspect of the disclosure, a first method, a first computer-readable medium, and a first apparatus are provided. The first apparatus may be a UE. The first apparatus may generate a payload of a first preamble message associated with a first RACH procedure, and the payload may indicate a first priority of the first RACH procedure that is relatively higher than a second priority of a second RACH procedure. The first apparatus may send the first preamble message including a RACH preamble and the payload to a base (Continued)

station, and the first preamble message may indicate an identifier (ID) of the first apparatus.

56 Claims, 11 Drawing Sheets

(51) Int. Cl.
*H04W 36/08* (2009.01)
*H04W 52/36* (2009.01)
*H04W 76/19* (2018.01)

(58) Field of Classification Search
USPC .......................................................... 370/329
See application file for complete search history.

(56) References Cited

U.S. PATENT DOCUMENTS

| | | | |
|---|---|---|---|
| 2017/0135135 A1 | 5/2017 | Pelletier et al. | |
| 2017/0332407 A1 | 11/2017 | Islam et al. | |
| 2018/0317264 A1 | 11/2018 | Agiwal et al. | |
| 2018/0324867 A1 | 11/2018 | Basu Mallick et al. | |
| 2018/0368179 A1* | 12/2018 | He | H04W 74/008 |
| 2019/0132882 A1* | 5/2019 | Li | H04W 74/0833 |
| 2019/0387541 A1* | 12/2019 | Agiwal | H04W 74/085 |
| 2020/0037345 A1* | 1/2020 | Ryoo | H04W 74/0833 |
| 2020/0107322 A1* | 4/2020 | Lunttila | H04W 74/0833 |
| 2020/0146054 A1* | 5/2020 | Jeon | H04W 74/0833 |

OTHER PUBLICATIONS

Supplementary European Search Report—EP20755814—Search Authority—The Hague—Sep. 30, 2022.
CATT: "RACH Priority Configuration", R2-1804480 3GPP TSG-RAN WG2 Meeting #101bis, Apr. 20, 2018 (Apr. 20, 2018), pp. 1-10, Sections 2-5.
Huawei, et al., "Two-step RACH Procedure for NR-U," 3GPP TSG-RAN WG2 Meeting #104, R2-1816617, Nov. 16, 2018 (Nov. 16, 2018) sections 1-3, 4 pages.
Intel Corporation: "Remaining Aspects for RACH Differentiation", R2-1805004 3GPP TSG-RAN WG2 Meeting #101bis, Apr. 20, 2018(Apr. 20, 2018), pp. 1-3, Section 2.
International Search Report and Written Opinion—PCT/CN2019/075028—ISA/EPO—Oct. 30, 2019.
International Search Report and Written Opinion—PCT/CN2020/075070—ISA/EPO—May 9, 2020.
Mediatek Inc: "LBT for Random Access in NR-U", 3GPP TSG-RAN2 Meeting #104, Tdoc R2-1816478, Nov. 16, 2018 (Nov. 16, 2018), 4 Pages, Sections 3-5.
OPPO: "Summary of Email Discussion [98-NR-14] On How to Determine the Priority of SR, A/N, and PUSCH in PHY", 3GPP TSG RAN WG1 #98bis, R1-1911438 (Revision of R1-1911556), Chongqing, China, Oct. 14-20, 2019, 42 Pages.

* cited by examiner

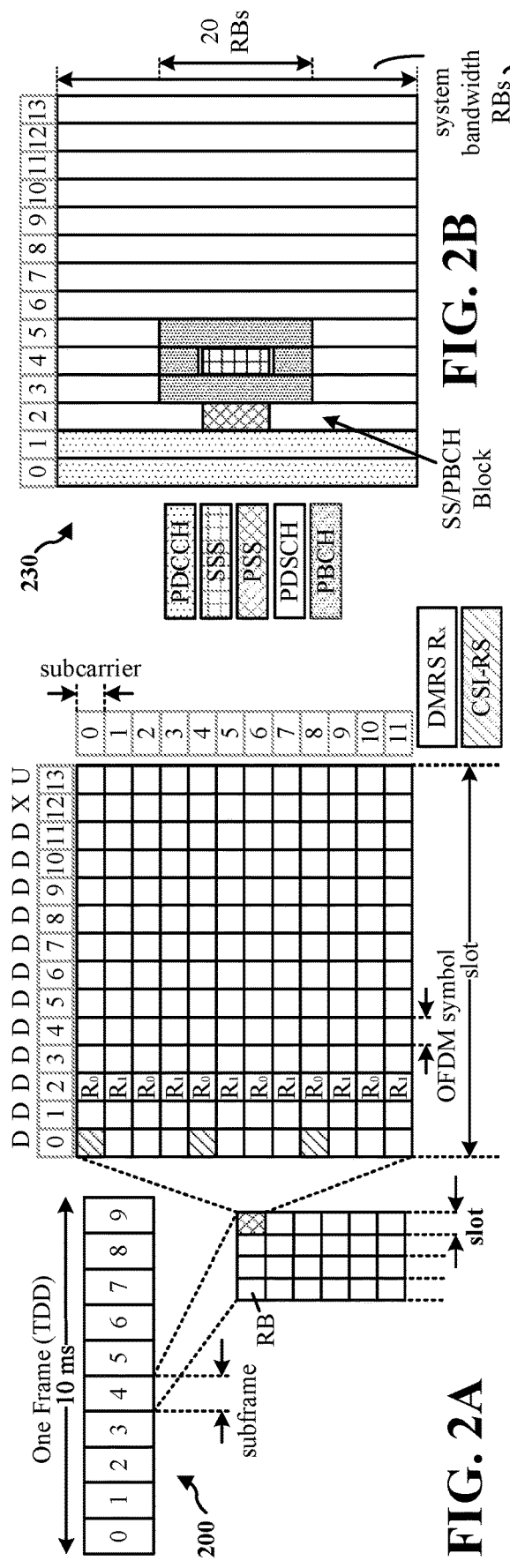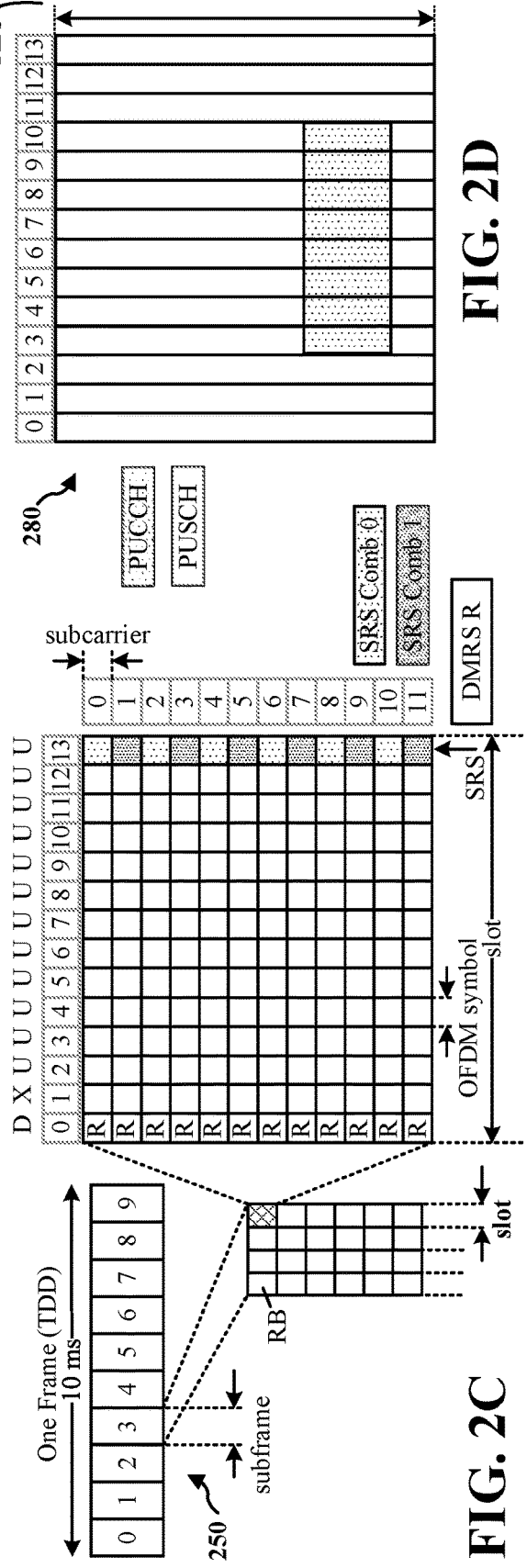

SYSTEM AND METHOD FOR PRIORITIZATION OF RANDOM ACCESS PROCEDURES

CROSS REFERENCE TO RELATED APPLICATION(S)

This application is a national stage entry of PCT Application No. PCT/CN2020/075070, entitled "SYSTEM AND METHOD FOR PRIORITIZATION OF RANDOM ACCESS PROCEDURES" and filed on Feb. 13, 2020, which claims priority to International PCT Application No. PCT/CN2019/075028, entitled "PRIORITIZATION OF RANDOM ACCESS PROCEDURES" and filed on Feb. 14, 2019, both of which are expressly incorporated by reference herein in their entirety.

BACKGROUND

Technical Field

The present disclosure relates generally to communication systems, and more particularly, to random access procedures in wireless communications networks.

Introduction

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

According to various radio access technologies (RATs), a random access or random access channel (RACH) procedure may be performed in order for a user equipment (UE) to acquire uplink timing synchronization and/or an uplink grant with a base station. Different conditions may cause the UE to perform a RACH procedure with a base station. For example, a UE may perform a RACH procedure during initial access to a cell provided by a base station, handover to the cell, reacquisition of uplink timing synchronization, recovery from a radio link failure, and so forth.

As RACH procedures may be performed for different causes, different attributes may be associated with different RACH procedures. According to various aspects, some UEs may need to acquire uplink timing synchronization more urgently than other UEs based on various conditions. For example, a UE may need to acquire uplink timing synchronization more urgently for handover or beam failure recovery than for initial access. However, UEs may lack mechanisms for indicating that some RACH procedures are of relatively higher priorities than other RACH procedures. Correspondingly, base stations may lack mechanisms for detecting that some RACH procedures should be prioritized over other RACH procedures.

Thus, wireless communications systems and access networks may benefit from mechanisms that indicate relatively priorities of RACH procedures. Accordingly, the present disclosure provides various techniques and solutions for indicating relative priorities of RACH procedures. Furthermore, the present disclosure provides various techniques and solutions for reducing the latency of some RACH procedures, such as those of relatively higher priorities.

In an aspect of the disclosure, a first method, a first computer-readable medium, and a first apparatus are provided. The first apparatus may be a UE. The first apparatus may generate a payload of a first preamble message associated with a first RACH procedure, and the payload may indicate a first priority of the first RACH procedure that is relatively higher than a second priority of a second RACH procedure. The first apparatus may send the first preamble message including a RACH preamble and the payload to a base station, and the first preamble message may indicate an identifier (ID) of the first apparatus.

In one aspect, the first RACH procedure is associated with one of handover or beam failure recovery, and the second RACH procedure is associated with initial access. The first apparatus may monitor for a first response message in a first RACH response (RAR) window and based on the first preamble message, and the first RAR window may be of a shorter duration than a second RAR window associated with the second RACH procedure. The first apparatus may receive the first response message in the first RAR window and based on the first preamble message, and the first response message may indicate the ID of the UE.

In one aspect, the first apparatus may further receive a second response message associated with the second RACH procedure in the second RAR window when the first response message is undetected in the first RAR window and based on the first preamble message, and the ID of the UE may be unindicated in the second response message. The first apparatus may further send a radio resource control (RRC) connection request to the base station based on the second response message, and the RRC connection request may include information in a physical uplink shared channel. The first apparatus may further receive a contention resolution message from the base station based on the RRC connection request.

In one aspect, the first apparatus may further receive information associated with the first priority and the second priority from the base station. The information may indicate the base station supports at least the first priority and the second priority. The information may indicate a first duration of a first RAR window associated with the first RACH procedure, and the first duration may be shorter than a second duration of a second RAR window associated with the second RACH procedure. The information may indicate at least one of a first power-ramping step or a first backoff interval associated with retransmission of the first preamble message for the first RACH procedure, and the at least one of the first power-ramping step or the first backoff interval may be different from a respective one of a second power-ramping step or a second backoff interval associated with retransmission of the second preamble message for the second RACH procedure. The information may be received in at least one system information block (SIB) when the UE is operating in an RRC Idle mode or an RRC Inactive Mode, and the information may be received via RRC signaling when the UE is operating in an RRC Connected mode. In one aspect, the first RACH procedure comprises a two-step RACH procedure, and the second RACH procedure comprises a four-step RACH procedure.

In an another aspect of the disclosure, a second method, a second computer-readable medium, and a second apparatus are provided. The second apparatus may be a base station. The second apparatus may receive a first preamble message of a first RACH procedure from a UE, and the first preamble message may indicate an ID of the UE, and the first preamble message may indicate a first priority of the first RACH procedure that is relatively higher than a second priority of a second RACH procedure. The second apparatus may send a first response message to the UE in a first RAR window based on the first preamble message, and the first response message may indicate the ID of the UE based on the first priority of the first RACH procedure, and the first RAR window may have a first duration that is shorter than a second duration of a second RAR window of the second RACH procedure.

In one aspect, the first RACH procedure is associated with one of handover or beam failure recovery, and the second RACH procedure is associated with initial access. The first apparatus may further send information associated with the first priority and the second priority. The information may indicate the second apparatus support at least the first priority and the second priority. The information may indicate the first duration of the first RAR window and the second duration of the second RAR window. The information may indicate at least one of a first power-ramping step or a first backoff interval associated with the first RACH procedure, and the at least one of the first power-ramping step or the first backoff interval may be different from a respective one of a second power-ramping step or a second backoff interval associated with the second RACH procedure. The information may be sent via broadcast in at least one SIB. The information may be sent to the UE via RRC signaling when the UE is operating in an RRC Connected mode. In one aspect, the first RACH procedure comprises a two-step RACH procedure, and the second RACH procedure comprises a four-step RACH procedure.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIGS. 2A, 2B, 2C, and 2D are diagrams illustrating examples of a first 5G/NR frame, DL channels within a 5G/NR subframe, a second 5G/NR frame, and UL channels within a 5G/NR subframe, respectively.

DETAILED DESCRIPTION

Figure 1:
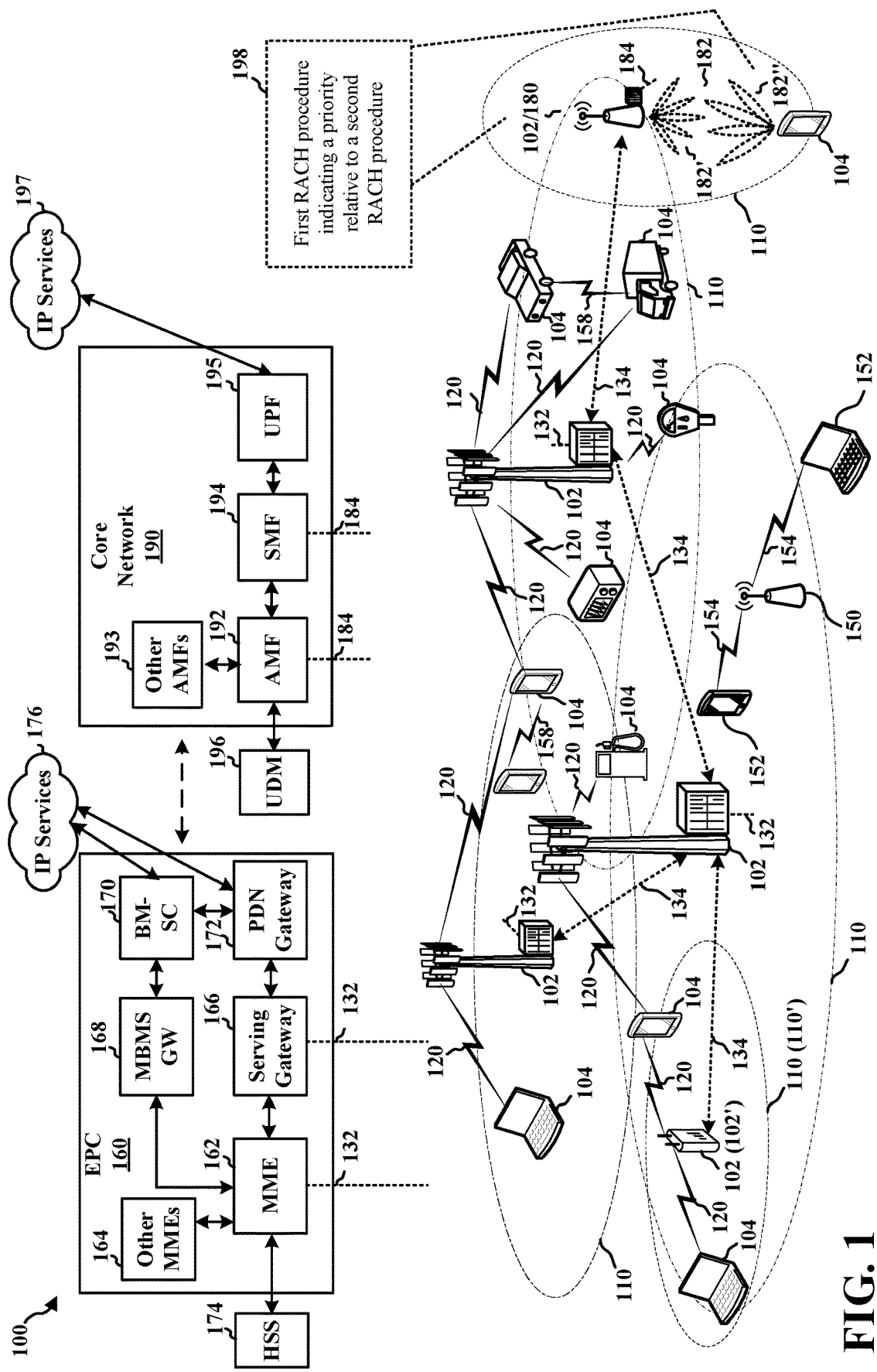
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, user equipment (UE) 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G Long Term Evolution (LTE) (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G New Radio (NR)(collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL)(also referred to as forward link)transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave (mmW) frequencies, and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band (e.g., 3 GHz-300 GHz) has extremely high path loss and a short range. The mmW base station 180 may utilize beamforming 182 with the UE 104 to compensate for the extremely high path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include a Access and Mobility Management Function (AMF) 192, other AMPs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Although the present disclosure may focus on 5G NR, the concepts and various aspects described herein may be applicable to other similar areas, such as LTE, LTE-Advanced (LTE-A), Code Division Multiple Access (CDMA), Global System for Mobile communications (GSM), or other wireless/radio access technologies.

Referring again to FIG. 1, in certain aspects, the UE 104 and the base station 102/180 may be configured to perform a first random access channel (RACH) procedure 198 that indicates a priority relative to a second RACH procedure. The UE 104 may be configured to perform both the first RACH procedure 198 and the second RACH procedure, e.g., in order to acquire uplink timing synchronization with the base station 102/180 and/or obtain an uplink grant from the base station 102/180. The first RACH procedure 198 may be a two-step RACH procedure, whereas the second RACH procedure may be a four-step RACH procedure. The first RACH procedure 198 may provide reduced latency relative to the second RACH procedure, e.g., because fewer messages are exchanged in the first RACH procedure 198 relative to the second RACH procedure. The reduction in latency may benefit the UE 104 when the UE 104 is acquiring uplink timing synchronization and/or an uplink grant, which may be appreciably more urgent in some contexts relative to some other contexts.

The IE 104 may perform the second RACH procedure during initial access, such as when the UE 104 enters a geographic area 110 of communication coverage provided by the base station 102/180. However, the UE 104 may perform the first RACH procedure 198 in some other situations, such as handover to the base station 102/180 and/or recovery from a beam or other radio link failure during communication with the base station 102/180. According to various aspects, the first RACH procedure 198 may be prioritized over other second RACH procedures performed by other UEs in the coverage area 110 of the base station 102/180. For example, the first RACH procedure 198 may be prioritized over other second RACH procedures because the UE 104 may have been connected and/or communicating with the base station 102/180 prior to the first RACH procedure 198 being triggered, and so may expect and benefit from the reduction in latency afforded by the first RACH procedure 198.

In order to inform the base station 102/180 that the UE 104 is performing the first RACH procedure 198, which should be prioritized over UEs performing the second RACH procedure, the UE 104 may generate a RACH preamble message that indicates the relatively higher priority of the first RACH procedure 198. For example, the UE 104 may generate a payload of a RACH preamble message when performing the first RACH procedure 198, and the payload may include information indicating the higher priority of the first RACH procedure 198 relative to other second RACH procedures. According to various aspects, the UE 104 may include different types of information in the payload of the RACH preamble message. For example, the payload may include an identifier (ID) of the UE 104 during initial access, as well as uplink data and/or control information. Potentially, the payload may be a radio resource control (RRC) message when the first RACH procedure 198 is performed in an RRC Connected mode.

In addition, the UE 104 may indicate an ID of the UE 104 in the RACH preamble message. In some aspects, the ID of the UE 104 may be a string (e.g., an alphanumeric or numeric string) that may uniquely identify the UE 104 in the access network (including the base station 102/180). This ID of the UE 104 may be provisioned before service or assigned to the UE 104 by network when the UE 104 initially attaches to the network. The UE 104 may explicitly or implicitly indicate the ID of the UE 104 via the RACH preamble message. In one aspect, the UE 104 may (explicitly) include information indicating the ID of the UE 104 in the payload. In another aspect, the ID of the UE 104 may include a random access (RA) radio network temporary identifier (RNTI), which the UE 104 may implicitly indicate through the RACH preamble message. For example, the UE 104 may select a timeslot in which to transmit the RACH preamble message, and the timeslot in which the RACH preamble message is transmitted may implicitly indicate the ID (e.g., RA-RNTI) of the UE 104.

By transmitting the RACH preamble message to the base station 102/180, the UE 104 may initiate the first RACH procedure 198. In connection with the reduced latency commensurate with the first RACH procedure 198, the UE 104 may monitor for a RACH response (RAR) message from the base station 102/180 in a first RAR window, which may have a duration that is shorter than a second RAR window associated with the second RACH procedure.

When the base station 102/180 receives the RACH preamble message, the base station 102/180 may decode the RACH preamble message to obtain the information in the payload. In so doing, the base station 102/180 may determine that the RACH preamble message initiates the first RACH procedure 198, and therefore, should be prioritized over any second RACH procedures performed by other UEs in the coverage area 110 of the base station 102/180.

Further, the base station 102/180 may obtain the ID of the UE 104 from the RACH preamble message. In one aspect, the base station 102/180 may obtain information indicating the ID of the UE 104 through decoding the payload of the RACH preamble message. In another aspect, the base station 1021180 may derive the ID of the UE 104, e.g., as an RA-RNTI that is implicitly indicated through the RACH preamble message. For example, the base station 102/180 may determine the timeslot in which the RACH preamble message is received, and base station 102/180 may determine (e.g., calculate) the RA-RNTI based on the timeslot in which the RACH preamble message is received from the UE 104, such as by using a preconfigured algorithm that considers the timeslot of the RACH preamble message.

Based on the RACH preamble message, the base station 102/180 may determine a timing advance and/or an uplink grant for the UE 104, and the base station 102/180 may generate a RAR message to indicate the timing advance and/or uplink grant. In addition, the base station 102/180 may indicate the ID of the UE 104 in the RAR message. For example, the base station 102/180 may scramble at least a portion of the RAR message with the RA-RNTI derived based on reception of the RACH preamble message. Subsequently, the base station 102/180 may send the RAR message in the first RAR window, instead of the second RAR window associated with other second RACH procedures.

When the UE 104 is monitoring for a RAR in the first RAR window, the UE 104 may receive and decode the RAR message from the base station 102/180, which may complete the first RACH procedure 198. The UE 104 may detect the ID of the UE 104 in the RAR message. For example, the UE 104 may decode at least a portion of the RAR message using the RA-RNTI of the UE 104, which may indicate that the RAR message is intended for the UE 104 in the first RACH procedure 198. Additionally, the UE 104 may detect the timing advance and/or uplink grant in the RAR message, which may be carried in a payload of the RAR message. The UE 104 may then apply the timing advance and/or transmit information according to the uplink grant in order to communicate with the base station 102/180.

FIG. 2A is a diagram 200 illustrating an example of a first subframe within a 5G/NR frame structure. FIG. 2B is a diagram 230 illustrating an example of DL channels within a 5G/NR subframe. FIG. 2C is a diagram 250 illustrating an example of a second subframe within a 5G/NR frame structure. FIG. 2D is a diagram 280 illustrating an example of UL channels within a 5G/NR subframe. The 5G/NR frame structure may be FDD in which for a particular set of subcarriers (carrier system bandwidth), subframes within the set of subcarriers are dedicated for either DL or UL, or may be TDD in which for a particular set of subcarriers (carrier system bandwidth), subframes within the set of subcarriers are dedicated for both DL and UL. In the examples provided by FIGS. 2A, 2C, the 5G/NR frame structure is assumed to be TDD, with subframe 4 being configured with slot format 28 (with mostly DL), where D is DL, U is UL, and X is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G/NR frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies μ 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology p, there are 14 symbols/slot and $2^\mu$ slots/subframe. The subcarrier spacing and symbol length/duration are a function of the numerology. The subcarrier spacing may be equal to $2^\mu*15$ kHz, where μ is the numerology 0 to 5. As such, the numerology μ=0 has a subcarrier spacing of 15 kHz and the numerology μ=5 has a subcarrier spacing of 480 kHz. The symbol length/duration is inversely related to the subcarrier spacing. FIGS. 2A-2D provide an example of slot configuration 0 with 14 symbols per slot and numerology μ=2 with 4 slots per subframe. The slot duration is 0.25 ms, the subcarrier spacing is 60 kHz, and the symbol duration is approximately 16.67 μs.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as $R_x$ for one particular configuration, where 100x is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Figure 3:
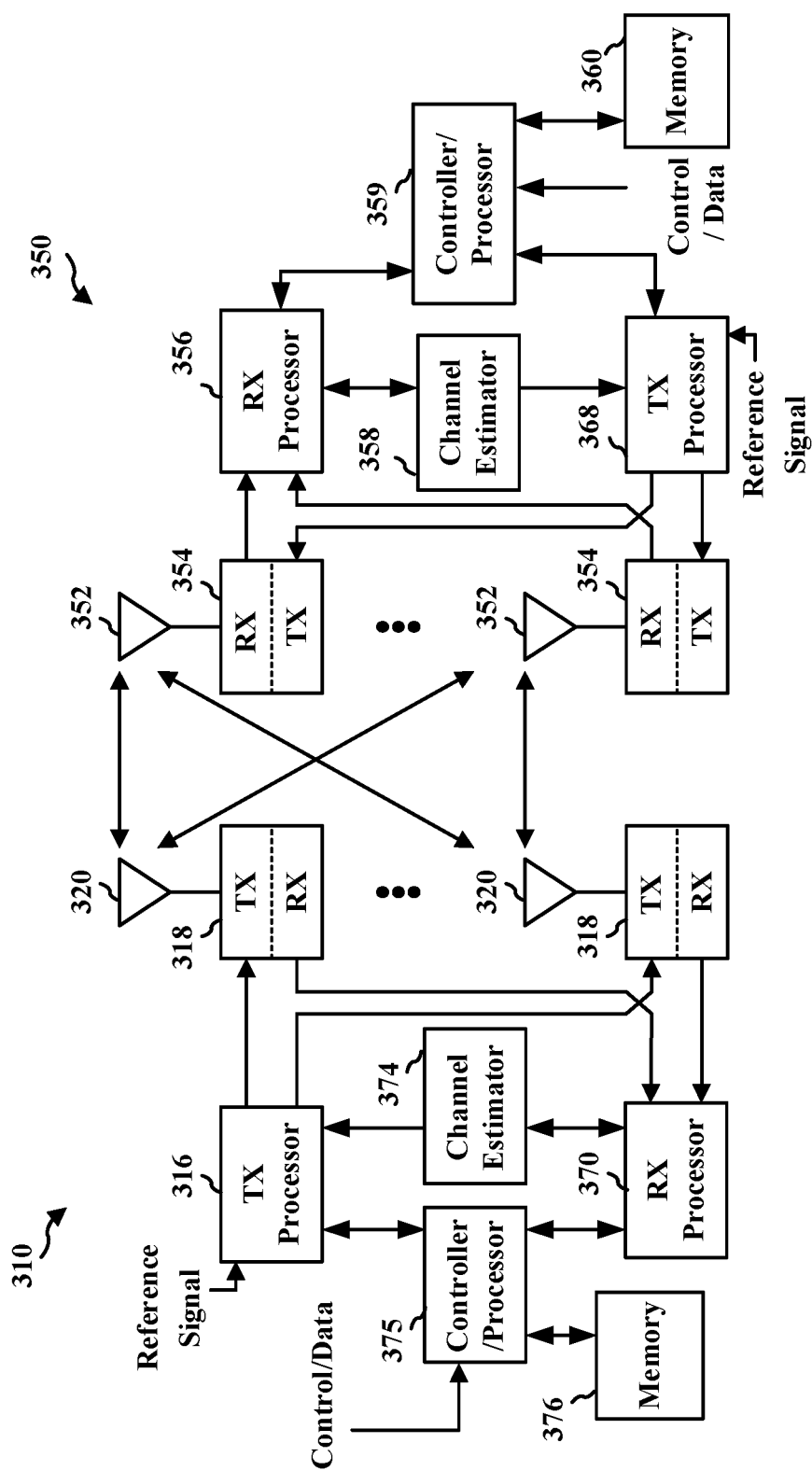
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

As described, supra, a UE may perform two types of RACH procedures with a base station, a first of which may be a two-step RACH procedure and a second of which may be a four-step RACH procedure. In both the first and second RACH procedures, the UE may acquire uplink timing synchronization and/or an uplink grant from the base station and, further, the UE may be able to provide some information to the base station (e.g., on an uplink data channel, such as a PUSCH).

Different RACH procedures may be associated with different priorities, e.g., because UEs may perform RACH procedures for different reasons. For example, RACH procedures triggered by handover or recovery from beam or other radio link failure may be prioritized over other RACH procedures, such as RACH procedures triggered by initial access. In a further aspect, RACH procedures may be associated with more than two priorities. For example, even within a two-step RACH procedure, a RACH procedure for beam failure recovery may be prioritized over another RACH procedure. In the context of RACH procedures, a UE transmitting a RACH request associated with a relatively higher priority RACH procedure may be allowed to use different parameters (e.g., higher power ramping steps, shorter or no back off intervals, etc.) than used in relatively lower priority RACH procedures in order to increase the likelihood of the UE winning in a RACH contention. A RACH procedure for handover, for example, may be prioritized over one for initial access because the handover RACH procedure is one operation included with the movement of a UE from one serving cell to another cell. The longer a handover procedure takes, the more interruption there may be to the UE's connectivity/service, and therefore, the sooner the UE is able to successfully complete handover (including the RACH procedure), the less impact handover will have on the UE's service quality and experience.

A UE performing a higher-priority (e.g., first) RACH procedure may need to acquire uplink timing synchronization and/or an uplink grant more quickly than a UE performing a lower-priority (e.g., second) RACH procedure. For example, UEs performing a first RACH procedure for beam failure recovery may benefit from a reduction in the latency commensurate with acquisition of uplink timing synchronization and/or an uplink grant more than other UEs performing a second RACH procedure for initial access. Therefore, reducing the latency of a higher-priority RACH procedure may improve UE and/or base station functionality and communication.

In order to provide the reduced latency of a higher-priority RACH procedure relative to a lower-priority RACH procedure, RACH procedures may be configured with different parameters, such as response windows, power ramping steps, backoff intervals, and so forth. For example, RACH procedures of a higher priority may include shorter RAR windows, shorter backoff intervals, and/or higher power ramping steps relative to RACH procedures of a lower priority. Thus, a UE performing a higher-priority RACH procedure may be able to begin (or resume) communicating data more quickly with a base station relative to a lower-priority RACH procedure. Furthermore, a UE performing a higher-priority RACH procedure may be able to successfully complete that RACH procedure more quickly relative to a lower-priority RACH procedure based on a relative reduction in the backoff interval and/or a relative increase in retransmission power when the higher-priority RACH procedure initially fails.

However, some base stations and UEs in some wireless communications and access networks may lack mechanisms for indicating the higher priority of one RACH procedure relative to another RACH procedure. For example, some base stations and UEs may not support partitioning RACH preambles and/or RACH occasions in the time domain, consequently hampering the differentiation of different types of RACH procedure.

Figure 4B:
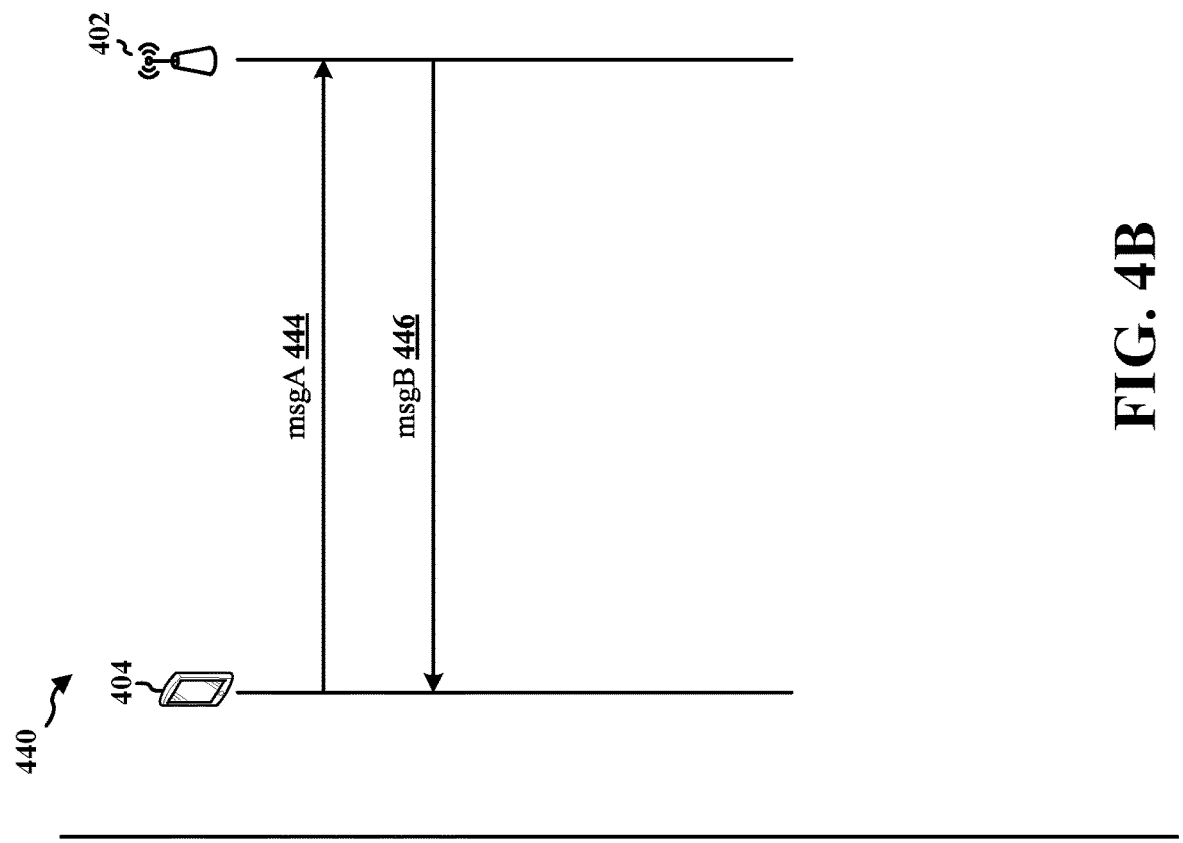
FIGS. 4A and 4B are call flow diagrams of examples of a UE performing random access channel (RACH) procedures with a base station.
Figure 4A:
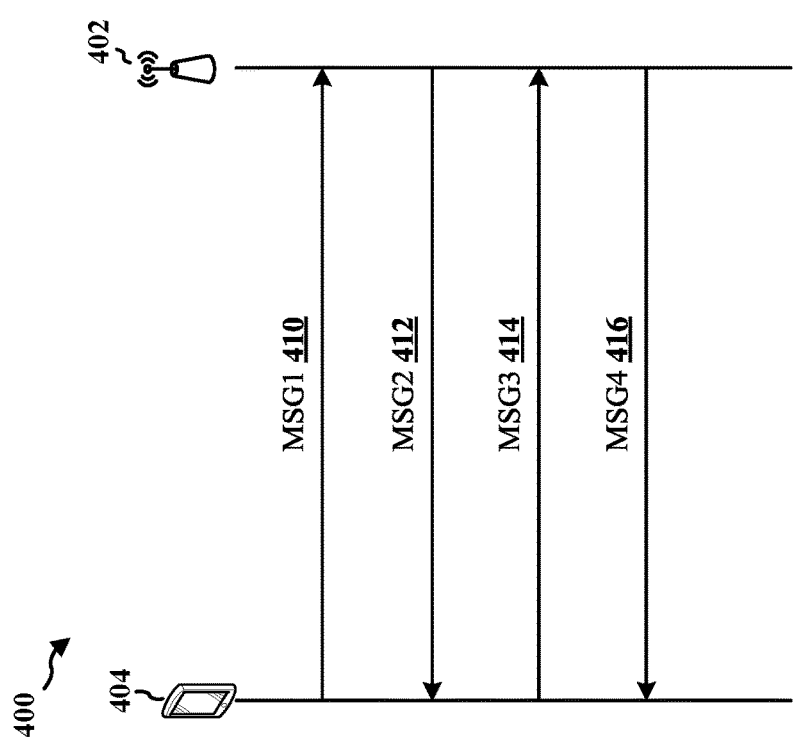

The present disclosure describes various techniques and solutions to differentiating RACH procedures of different priorities. Referring to FIGS. 4A-4B, examples of different RACK procedures are illustrated. Continuing to FIGS. 5-11, techniques and solutions are described for selecting and indicating higher-priority RACH procedures by UEs, as well as for recognizing and responding in higher-priority RACH procedures by base stations. In connection with the prioritization of RACH procedures, the latency in completing higher-priority RACH procedures (e.g., to acquire uplink timing synchronization and/or an uplink grant) may be reduced relative to lower-priority RACH procedures.

FIGS. 4A and 4B illustrate call flow diagrams of a four-step RACH procedure 400 and a two-step RACH procedure 440, respectively. The base station 402 may be configured to provide a cell. For example, in the context of FIG. 1, the cell may include a geographic coverage area 110 in which communication coverage is provided and/or a small cell 102' having a coverage area 110'. A UE 404 may perform either of the RACH procedures 400, 440 with a base station 402 (e.g., a mmW base station, an eNB, a gNB, etc.), for example, in order to acquire uplink timing synchronization and/or an uplink grant for communication in a wireless communications/access network. In both RACH procedures 400, 440, a RACH preamble may be used, e.g., to distinguish different messages from different UEs.

A RACH preamble may be transmitted as a sequence, such as a Zadoff-Chu sequence. The number of orthogonal or separable Zadoff-Chu sequences that may occupy a set of time/frequency resources allocated for a RACH procedure (e.g., a RACH region) may depend on the available number of cyclic shifts associated with a Zadoff-Chu sequence. For example, the base station 402 may configure a particular number of cyclic shifts $N_{CS}$, a starting root sequence configuration (e.g., root sequence index), and a maximum number of preambles in a cell provided by the base station 402.

The base station 402 may send a set of RACH parameters to the UE 404, indicating the number of cyclic shifts $N_{CS}$, the starting root sequence configuration, and/or the maximum number of preambles. The base station 402 may send a set of RACH parameters for the four-step RACH procedure 400 in at least one SIB. However, the base station 402 may send a different set of RACH parameters for the two-step RACH procedure 440 in at least one SIB and/or in one or more RRC messages.

Based on the root sequence index and the available number of cyclic shifts $N_{CS}$, the UE 404 may generate a set of sequences. For example, the UE 404 may generate each sequence up to the number of RACH preambles supported in the cell provided by the base station 402—e.g., the UE 404 may generate 64 sequences. In one aspect, the UE 404 may generate each sequence of the set of sequences by generating a base sequence (e.g., Zadoff-Chu sequence) using the starting root sequence index indicted by the corresponding set of RACH parameters, and then by applying cyclic shifts to the base sequence until the maximum number of sequences supported in the cell are found (e.g., 64 sequences). If the maximum number of sequences supported in the cell cannot be generated from the base sequence, the UE 404 may similarly generate the remaining sequences using at least one root sequence that corresponds to the next consecutive logical root sequence index.

A set of RACH parameters configured for one of the RACH procedures 400, 440 may indicate other information in addition to the number of cyclic shifts $N_{CS}$, the starting root sequence configuration, and/or the maximum number of preambles. For example, a set of RACH parameters may indicate a received target power (e.g., the power with which the base station 402 requests to receive a RACH preamble), a maximum number of preamble transmissions associated with a RACH procedure (e.g., a threshold maximum number of times the UE 404 may attempt transmission of a RACH preamble without receiving a response from the base station), a power-ramping step (e.g., an amount of additional power to be used by the UE 404 for each successive RACH preamble transmission attempt), a candidate beam threshold (e.g., a threshold for a reference signal received power (RSRP) measured for a candidate beam to be used for RACH preamble transmission), a PRACH frequency offset (e.g., a frequency position that the UE 404 is to use for RACH preamble transmission), and/or a candidate beam reference signal list (e.g., a list of SS/PBCH and/or CSI-RS indexes corresponding to candidate beams). Different sets of RACH parameters may include more or fewer parameters. For example, one or more RACH parameters may be applicable to a RACH procedure for beam failure recovery, but inapplicable for initial access.

The base station 402 may configure a first RACH parameters for the four-step RACH procedure 400 and a second set of RACH parameters for the two-step RACH procedure 440. For example, the base station 402 may configure the first set of RACH parameters for initial access, cell selection, and/or cell reselection, and may configure the second set of RACH parameters for beam/radio-link failure recovery and/or handover. The two sets of RACH parameters may share all, some, or none of the respective RACH parameters in common.

With respect to the four-step RACH procedure 400 of FIG. 4A, the UE 404 may determine (e.g., generate, select, etc.) a RACH preamble for the RACH procedure 400. Further, the UE 404 may determine an RA-RNTI in order to separate the UE 404 from other UEs during preamble transmission of the RACH procedure 400. The UE 404 may indicate the RACH preamble and the RA-RNTI through the MSG1 410. The UE 404 may transmit the MSG1 410 to the base station 402, e.g., in a RACH occasion.

Based on the MSG1 410, the base station 402 may generate and transmit a MSG2 412 to the UE 404. The MSG2 412 may also be known as an RAR. For uplink timing transmission, the base station 402 may determine a timing advance and/or an uplink resource grant to be included in the MSG2 412. The base station may also include a temporary cell RNTI (T-CRNTI) in the MSG2 412. The base station 402 may send the MSG2 412 to the UE 404.

When the UE 404 receives the MSG2 412, the UE 404 applies the timing advance for uplink timing synchronization. The UE 404 responds to the MSG2 412 with a MSG3 414. The MSG3 414 may also be known as an RRC connection request message and/or a scheduled transmission message. In the MSG3 414, the UE 404 may indicate a temporary mobile subscriber identity (TMSI) associated with the UE 404 or another random value used to identify the UE 404, as well as a connection establishment clause. The UE 404 may transmit the MSG3 414 to the base station 402, and at least a portion of the information in the MSG3 414 may be carried on an uplink data channel (e.g., based on the uplink grant in the MSG2 412), such as a PUSCH.

The base station 402 may receive the MSG3 414 and, based thereon, may generate and transmit a MSG4 416. The MSG4 416 may also be known as a contention resolution message. The base station 402 may address the MSG4 416 toward the TMSI or random value indicated by the UE 404 through the MSG3 414. The MSG4 416 may complete the four-step RACH procedure 400, e.g., when received by the UE 404.

FIG. 4B illustrates a method of a two-step RACH procedure 440. The two-step RACH procedure 440 may be used for, inter alia, beam/radio-link failure recovery and/or handover between cells (e.g., handover to from another base station to the base station 402). The UE 404 may initiate the two-step RACH procedure 440 by transmitting a msgA 444 to the base station 402. In some aspects, the msgA 444 may include information from both the MSG1 410 and the MSG3 414 of the four-step RACH procedure 400.

For the msgA 444, the UE 404 may determine (e.g., generate and select) a RACH preamble. In addition, the UE 404 may include a payload in the msgA 444, which may include data to be transmitted to the base station 402 by the UE 404. The UE 404 may include at least a portion of the payload of the msgA 444 on an uplink data channel, such as a PUSCH.

Further to the msgA 444, the UE 404 may explicitly or implicitly indicate the ID of the UE 404. In one aspect, the UE 404 may (explicitly) include information indicating the ID of the UE 404 in the payload of the msgA 444. In another aspect, the ID of the UE 404 may include an RA-RNTI, which the UE 404 may implicitly indicate through the msgA 444. For example, the UE 404 may select a timeslot in which to transmit the msgA 444, and the timeslot in which the msgA 444 is transmitted may implicitly indicate the ID (e.g., RA-RNTI) of the UE 404.

The base station 402 may receive and decode the msgA 444. The base station 402 may respond to the msgA 444 with a msgB 446. Based on the msgA 444, the base station 402 may determine a timing advance and/or an uplink grant for the UE 404. The base station 402 may generate a msgB 446 (e.g., RAR) to indicate the timing advance and/or uplink grant. In some aspects, the msgB 446 may include information from both the MSG2 412 and the MSG4 416 (e.g., a contention resolution message) of the four-step RACH procedure 400.

Additionally, the base station 402 may indicate the ID of the UE 404 (detected from the msgA 444) in the msgB 446. In one aspect, the base station 402 may obtain information indicating the ID of the UE 404 through decoding the payload of the msgA 444. In another aspect, the base station 402 may derive the ID of the UE 404, e.g., as an RA-RNTI that is implicitly indicated through the msgA 444. For example, the base station 402 may determine the timeslot in which the msgA 444 is received, and base station 402 may determine (e.g., calculate) the RA-RNTI based on the timeslot in which the msgA 444 is received from the UE 404, such as by using a preconfigured algorithm that considers the timeslot of the msgA 444.

The base station 402 may then transmit the msgB 446 to the UE 404. A portion of the msgB 446 (e.g., control information) may be carried on a downlink control channel, whereas another portion of the msgB 446 (e.g., data) may be carried on a downlink data channel. For example, the downlink control channel may be a PDCCH and the downlink data channel may be a PDSCH.

In transmitting the msgB 446 to the UE 404, the base station 402 may address the msgB 446 to the ID of the UE 404 detected based on reception of the msgA 444. In one aspect, the base station 402 may scramble at least a portion of the RAR message with the RA-RNTI derived based on reception of the msgA 444. In another aspect, the base station 402 may explicitly indicate the ID of the UE 404 in the msgB 446, such as by including information indicating the ID of the UE 404 on one of the aforementioned downlink channels.

The UE 404 may monitor a RAR window configured for the two-step RACH procedure 440 and the UE 404 may detect and receive the msgB 446, in the RAR window, to complete the two-step RACH procedure 440. An RAR window may be a time period during which a UE performing a RACH procedure expect a RAR from a base station. In various aspects, the UE 404 may apply the timing advance indicated in the msgB 446 to acquire uplink timing synchronization with the base station 402 and/or the UE 404 may transmit information to the base station 402 according to the uplink grant indicated in the msgB 446.

Figure 5:
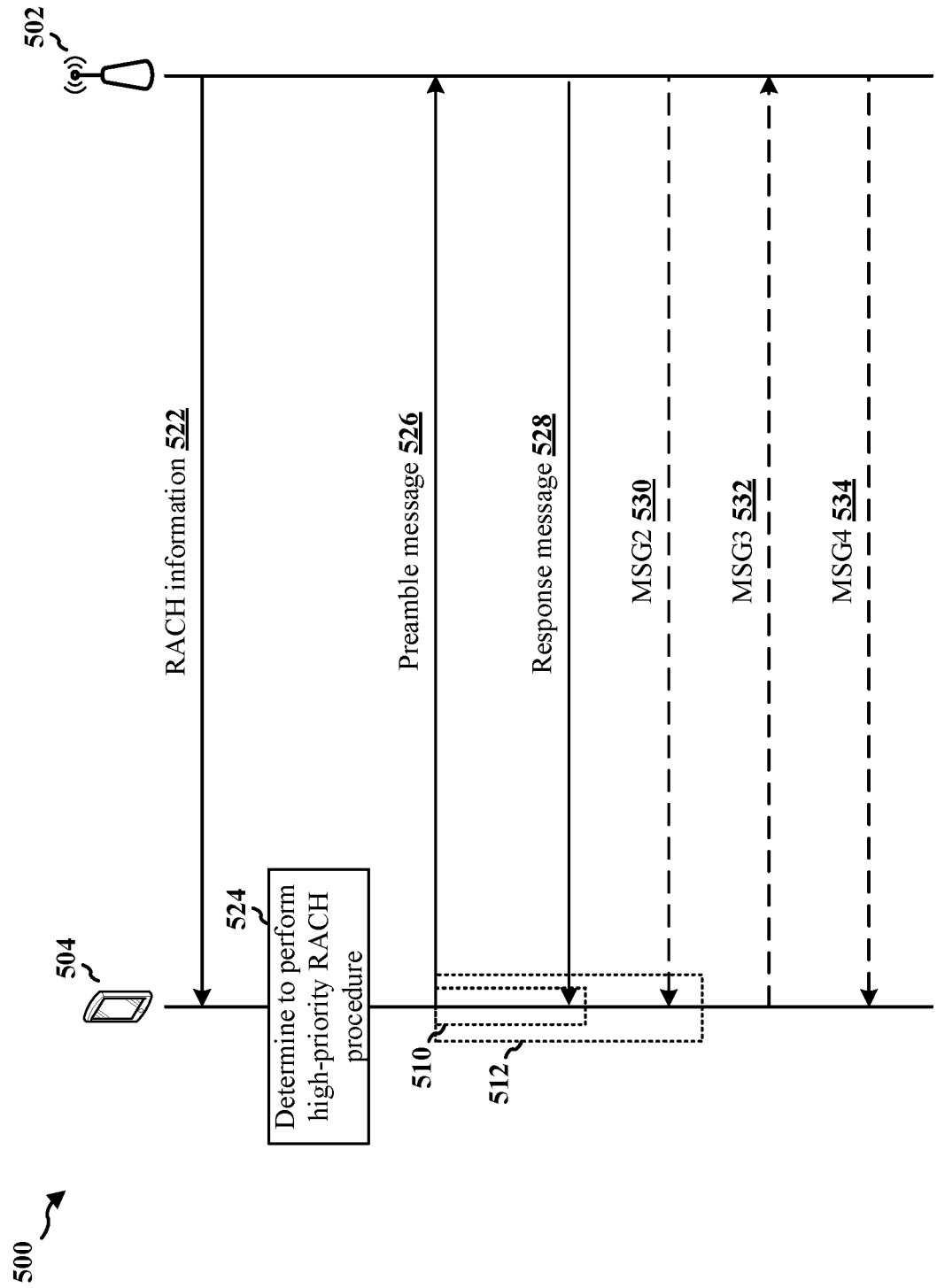
FIG. 5 is a call flow diagram of an example of a UE performing RACH procedures associated with prioritizations with a base station.

Referring to FIG. 5, a call flow diagram illustrates an example RACH procedure 500 in a wireless communications system by a UE 504 and a base station 502, e.g., during handover or beam/radio-link failure recovery, in accordance with aspects of the present disclosure. Referring to FIGS. 1, 3, and 4A-4B, the base station 502 may be implemented as the base station 102/180, the base station 310, and/or the base station 402, and the UE 504 may be implemented as the UE 104, the UE 350, and/or the UE 404. The base station 502 may be configured to provide a cell on which the UE 504 may operate. For example, in the context of FIG. 1, the cell may include a geographic area 110 in which communication coverage is provided and/or a small cell 102' having a coverage area 110'.

According to various aspects, at least two priorities of RACH procedures may be supported between the base station 502 and the UE 504—for example, a first RACH procedure may have a higher priority relative to a second RACH procedure. The first RACH procedure may be a two-step RACH procedure, and the second RACH procedure may be a four-step RACH procedure. For example, referring to FIGS. 4A-48, the first RACH procedure may include the two-step RACH procedure 440, and the second RACH procedure may include the four-step RACH procedure 400.

In some further aspects, more than two priorities may be supported. For example, a RACH procedure for beam/radio-link failure recovery may be prioritized over a RACH procedure for handover within a two-step RACH procedure, and both types of two-step RACH procedures may be prioritized over a four-step RACH procedure configured for initial access.

The base station 502 may configure a first set of parameters for the first RACH procedure and may configure a second set of parameters for the second RACH procedure. For example, the base station 502 may configure a respective subset of each of the first and second sets of RACH parameters for generation of a RACH preamble by the UE 504, e.g., including a particular number of cyclic shifts $N_{CS}$, a starting root sequence configuration (e.g., root sequence index), a maximum number of preambles in the cell provided by the base station 502, and/or other RACH-related information. The base station 502 may configure at least one parameter of the first set of parameters to be different from a corresponding parameter of the second set of parameters.

Because the first RACH procedure may be prioritized over the second RACH procedure, the base station 502 may configure parameters for the first RACH procedure in order to reduce the latency commensurate with successfully completing the first RACH procedure relative to that of the second RACH procedure. In one aspect, the base station 502 may configure a first RAR window 510 for the first RACH procedure. The first RAR window 510 may be a first time period during which UEs performing the first RACH procedure may expect a first RAR (e.g., responsive to a RACH preamble message or msgA). For the latency reduction, the base station 502 may configure the first time period to be shorter than a second time period of a second RAR window 512. The second RAR window 512 may be the second time period during which UEs performing the second RACH procedure may expect a second RAR (e.g., responsive to a RACH preamble message or MSG1).

While the shorter first RAR window 510 may reduce the latency of the first RACH procedure itself, RACH procedures may occasionally fail, e.g., due to interference, decoding errors, and the like. For example, a RACH procedure may fail when the UE 504 transmits a RACH preamble message (e.g., msgA for the first RACH procedure or MSG1 for the second RACH procedure), but does not receive a RAR (e.g., msgB for the first RACH procedure or MSG2 for the second RACH procedure) within the corresponding one of the RAR windows 510, 512. The UE 504 may reattempt a RACH procedure by retransmitting the RACH preamble message. The base station 502 may configure such parameters for reattempting RACH procedures.

Two examples of parameters that the base station 502 may configure for reattempting a RACH procedure include a power-ramping step and a backoff interval. The power-ramping step may be an amount by which a UE is allowed to increase the UE's transmission power when reattempting a RACH procedure after a failed RACH procedure. The backoff interval may be the time period that a UE should wait before reattempting a RACH procedure.

The base station 502 may configure a first power-ramping step and/or a first backoff interval for the first RACH procedure, and may configure a second power-ramping step and/or a second backoff interval for the second RACH procedure. The base station 502 may configure the first power-ramping step and/or the first backoff interval to be different from the second power-ramping step and/or the second backoff interval, respectively. For example, the first power-ramping step may be greater than the second power-ramping step and/or the first backoff interval may be shorter than the second backoff interval, which may reduce the latency, relative to reattempting the second RACH procedure, when reattempting the first RACH procedure.

The base station 502 may configure and transmit (e.g., broadcast) RACH information associated with the second RACH procedure, e.g., in at least one SIB. If the UE 504 is initially accessing the cell (e.g., not handed over from another cell), the UE 504 may receive the RACH information for the second RACH procedure, and may perform the second RACH procedure for initial access to acquire uplink timing synchronization and/or an uplink grant with the base station 502.

The base station 502 may also configure and transmit RACH information 522 for the first RACH procedure. In some aspects, the base station 502 may broadcast at least a portion of the RACH information 522 in at least one SIB. When the UE 504 is operating in an RRC Idle mode or an RRC Inactive mode, the UE 504 may receive the at least one SIB and may obtain the at least the portion of the RACH information 522. When the UE 504 is operating an in RRC Connected mode, the base station 502 may transmit at least a portion of the RACH information 522 via UE-specific (e.g., RRC) signaling. Accordingly, the UE 504 may receive one or more RACH messages from the base station 502, and the UE 404 may obtain at least a portion of the RACH information 522.

The RACH information 522 may indicate that the base station 502 supports at least two priorities of RACH procedures. In addition, the RACH information 522 may indicate the first set of parameters for the first RACH procedure. For example, the RACH information 522 may indicate the particular number of cyclic shifts $N_{CS}$, the starting root sequence configuration (e.g., root sequence index), the maximum number of preambles in the cell provided by the base station 502, and/or other RACH-related information.

When operating in the wireless communications/access network, the UE 504 may determine 524 to perform the first RACH procedure, e.g., after receiving the RACH information 522 for the first RACH procedure. For example, the UE 504 may detect failure of a beam or other radio link through which the UE 504 is communicating with the base station 502 or the UE 504 may detect that the UE 504 is handed over to the base station 502 (e.g., from a source base station). When the UE 504 detects the beam/radio-link failure or handover, the UE 504 may determine 524 that the UE 504 should perform the higher-priority first RACH procedure instead of the lower-priority second RACH procedure.

In addition, the UE 504 may determine whether the base station 502 supports the prioritization of RACH procedures based on the RACH information 522. If the UE 504 determines that the base station 502 supports the higher-priority first RACH procedure, then the UE 504 may determine 524 that the UE 504 should perform the higher-priority first RACH procedure. However, if the UE 504 determines that the base station 502 does not support the higher-priority first RACH procedure, then the UE 504 may determine 524 that the UE 504 should perform the second RACH procedure (e.g., four-step RACH procedure). For example, if the UE 504 does not receive any information indicating that the base station 502 supports prioritization of RACH procedures, then the UE 504 may determine that the base station 502 does not support the higher-priority first RACH procedure and may initiate the second RACH procedure.

To initiate the first RACH procedure, the UE 504 may generate and transmit a preamble message 526. The preamble message 526 may also be known as a "msgA" for a two-step RACH procedure. The UE 504 may send the preamble message 526 to the base station 502, e.g., on a set of resources allocated for preamble transmission of the first RACH procedure and/or in a RACH occasion configured for the first RACH procedure. The set of resources allocated for preamble transmission of the first RACH procedure and/or the RACH occasion configured for the first RACH procedure may be indicated, for example, in the RACH information 522 and/or in a SIB.

For the preamble message 526, the UE 504 may generate a RACH preamble, e.g., based on the set of parameters indicated in the RACH information 522. Further, the UE 504 may generate a payload for the preamble message 526. The UE 504 may generate the payload to indicate the relatively higher priority of the first RACH procedure that the UE 504 is initiating through the preamble message 526. For example, the UE 504 may include a value in the payload of the preamble message 526 that indicates the preamble message 526 is for the higher-priority first RACH procedure.

In addition, the UE 504 may indicate an ID of the UE 504 in the preamble message. The UE 504 may explicitly or implicitly indicate the ID of the UE 504 via the preamble message 526. In one aspect, the UE 504 may (explicitly) include information indicating the ID of the UE 504 in the payload of the preamble message 526. In another aspect, the UE 504 may implicitly indicate the ID of the UE 504 via the preamble message 526 (e.g., via transmission of the preamble message 526). For example, the UE 504 may select a timeslot in which to transmit the preamble message 526, and the timeslot in which the preamble message 526 is transmitted may implicitly indicate the ID (e.g., RA-RNTI) of the UE 504. Further to such an example, the UE 504 may determine the ID (e.g., RA-RNTI) used by the UE 504 by calculating the ID of the UE 504 using a preconfigured algorithm that configures the timeslot in which the UE 504 transmits the preamble message 526.

The base station 502 may receive the preamble message 526 and, in response, may begin an RAR timer, which may be associated with the first RAR window 510 and/or the second RAR window 512. The base station 502 may decode the preamble message 526. If the base station 502 successfully decodes the preamble message 526, the base station 502 may determine that the payload of the preamble message 526 indicates the higher priority of the first RACH procedure by the UE 504.

Further to receiving the preamble message 526, the base station 502 may determine that the preamble message 526 indicates the ID of the UE 504. When the ID of the UE 504 is carried in the payload of the preamble message 526, the base station 502 may obtain information indicating the ID of the UE 504 through decoding the payload of the preamble message 526. In another aspect, the base station 502 may derive the ID of the UE 504 via an implicit indication of the preamble message 526 (e.g., via receiving the preamble message 526). For example, the base station 502 may determine the ID of the UE 504 is implicitly indicated in the preamble message 526 as an RA-RNTI. The base station 502 may determine the timeslot in which the preamble message 526 is received, and base station 502 may determine (e.g., calculate) the RA-RNTI based on the timeslot in which the preamble message 526 is received from the UE 504, such as by using a preconfigured algorithm that considers the timeslot of the preamble message 526.

When the base station 502 determines the preamble message 526 indicates the higher priority of the first RACH procedure by the UE 504, the base station 502 may determine that the base station 502 is to respond to the preamble message 526 within the first RAR window 510. Accordingly, the base station 502 may generate and send a response message 528 (also known as an "RAR") in the first RAR window 510, e.g., according to the RAR timer that the base station 502 started upon receiving the preamble message 526. The response message 528 may be a response from the base station 502 to the preamble message 526 transmitted by the UE 504. The response message 528 may include different fields in different aspects—for example, the response message may include an index of the preamble in the preamble message 526, timing advance information, uplink grant information, and so forth. In the first RACH procedure, the response message 528 may also be known as a "msgB."

Based on receiving the preamble message 526, the base station 502 may determine a timing alignment or timing command to be applied by the U E 504 so that the UE 504 may acquire uplink timing synchronization and/or the base station 502 may determine an uplink grant on which the UE 504 may transmit uplink data and/or control information to the base station 502. The base station 502 may indicate the timing command and/or uplink grant in the response message 528. The base station 502 may include other information in the response message 528, such as a contention resolution message.

The base station 502 may indicate the ID of the UE 504 via the response message 528 (e.g., the same ID of the UE 504 indicated via the preamble message 526). For example, the base station 502 may explicitly include information indicating the ID of the UE 504 in the response message 528. In another example, the base station 502 may scramble at least a portion of the response message 528 with the ID (e.g., RA-RNTI) of the UE 504. A portion of the response message 528 (e.g., control information) may be carried on a downlink control channel, whereas another portion of the response message 528 (e.g., data) may be carried on a downlink data channel. For example, the downlink control channel may be a PDCCH and the downlink data channel may be a PDSCH.

The UE 504 may monitor a common search space and/or control resource set (CORESET) for the response message 528 in the first RAR window 510 after sending the preamble message 526, For example, the UE 504 may begin a countdown timer when the UE 504 sends the preamble message 526, and the UE 504 may determine whether the response message 528 is received within the first RAR window 510 based on whether the countdown timer has expired when the response message 528 is received.

When the UE 504 receives the response message 528 within the first RAR window 510, the first RACH procedure may be completed. The UE 504 may detect the ID of the UE 504 in the response message 528, such as by successfully decoding data and/or control information carried on a downlink data channel and/or downlink control channel of the response message 528. Further, the UE 504 may determine the timing advance and/or uplink grant from the response message 528, such as by successfully decoding data and/or control information carried on a downlink data channel and/or a downlink control channel of the response message 528. The UE 504 may apply the timing advance for uplink timing synchronization with the base station 502 and/or the UE 504 may communicate with the base station 502 according to the uplink grant.

However, the UE 504 may receive a response to the preamble message 526 that is outside of the first RAR window 510 and/or does not indicate the ID of the UE 504. For example, the base station 502 may be unable to successfully decode at least a portion of the preamble message 526 and, therefore, the base station 502 may be unable to detect the ID of the UE 504 and/or the indication of the higher priority associated with the preamble message 526. Thus, in one aspect, the base station 502 may not include the ID of the UE 504 in the response message 528.

Potentially, the base station 502 may not send the response message 528 in the first RAR window 510. In one aspect, if the base station 502 does not detect the indication of the higher priority in the payload of the preamble message 526, the base station 502 may determine that the preamble message 526 is for the second RACH procedure and, therefore, should be send in the second RAR window 512. In another aspect, if the base station 502 does not detect the ID of the UE 504 in the payload of the preamble message 526, the base station 502 may determine that the preamble message 526 is for the second RACH procedure and, therefore, should be sent in the second RAR window 512. Accordingly, the base station 502 may generate and send the MSG2 530 in the second RAR window 512, instead of the response message 528.

In one aspect, if the UE 504 receives the MSG2 530 (e.g., instead of the response message 528 expected in response to the preamble message 526) that does not include the ID of the UE 504 on a downlink channel, then the UE 504 may determine that the second RACH procedure may still be performed based on the preamble message 526. In another aspect, if the UE 504 does not receive the response message 528 in the first RACH window 510, then the UE 504 may determine that the second RACH procedure may still be performed based on the preamble message 526. That is, the UE 504 may fall back to the four-step second RACH procedure if the UE 504 is unable to receive the response message 528 including the ID (e.g., on a downlink data and/or control channel) of the UE 504 in the first RAR window 510 for the two-step first RACH procedure.

If the response message 528 is unreceived in the first RAR window 510, the UE 504 may continue monitoring the common search space in the second RAR window 512. Like for the first RAR window 510, the UE 504 may begin a timer when the UE 504 sends the preamble message 526, and the UE 504 may determine whether a response to the preamble message 526 is received within the second RAR window 512 based on the timer. When the UE 504 receives the MSG2 530 in the second RAR window 512, the IE 504 may determine a timing advance and/or uplink grant from the MSG2 530. The UE 504 may apply the timing advance to acquire uplink synchronization with the base station 502.

When the UE 504 falls back to the four-step second RACH procedure, the UE 504 may generate and send a MSG3 532. The MSG3 532 may include an RRC connection request. The UE 504 may transmit information of the MSG3 532 on a uplink data channel, e.g., based on the uplink grant included in the response message 528 or the MSG2 530. The uplink data channel may be a PUSCH.

When the base station 502 receives the MSG3 532, the base station 502 may generate a MSG4 534. The base station 502 may include a contention resolution message in the MSG4 534. The base station 502 may transmit the MSG4 534 on a downlink control channel and a downlink data channel, such as a PDCCH and a PDSCH, respectively. When the UE 504 receives the MSG4 534, the second RACH procedure may be completed, and the UE 504 may transmit uplink traffic to and/or receive downlink traffic from the base station 502.

If the UE 504 is receives neither the response message 528 in the first RAR window 510 nor the MSG2 530 in the second RAR window 512, the UE 504 may reattempt the first RACH procedure. Accordingly, the UE 504 may reattempt transmission of a preamble message 526, which may include the ID of the UE 504 and the payload indicating the higher priority associated with the preamble message 526 of the first RACH procedure.

When the UE 504 reattempts the first RACH procedure, the UE 504 may apply one or more parameters associated with the higher-priority first RACH procedure and indicated by the RACH information 522. For example, the UE 504 may wait for a time period corresponding to the first backoff interval indicated in the RACH information 522 and/or the UE 504 may increase the transmission power for retransmission of the preamble message 526 according to the first power-ramping step indicated in the RACH information 522. The UE 504 may again monitor for the response message 528 in the first RACH window 510 and continue the first RACH procedure or fall back to the second RACH procedure, as described herein.

Figure 6:
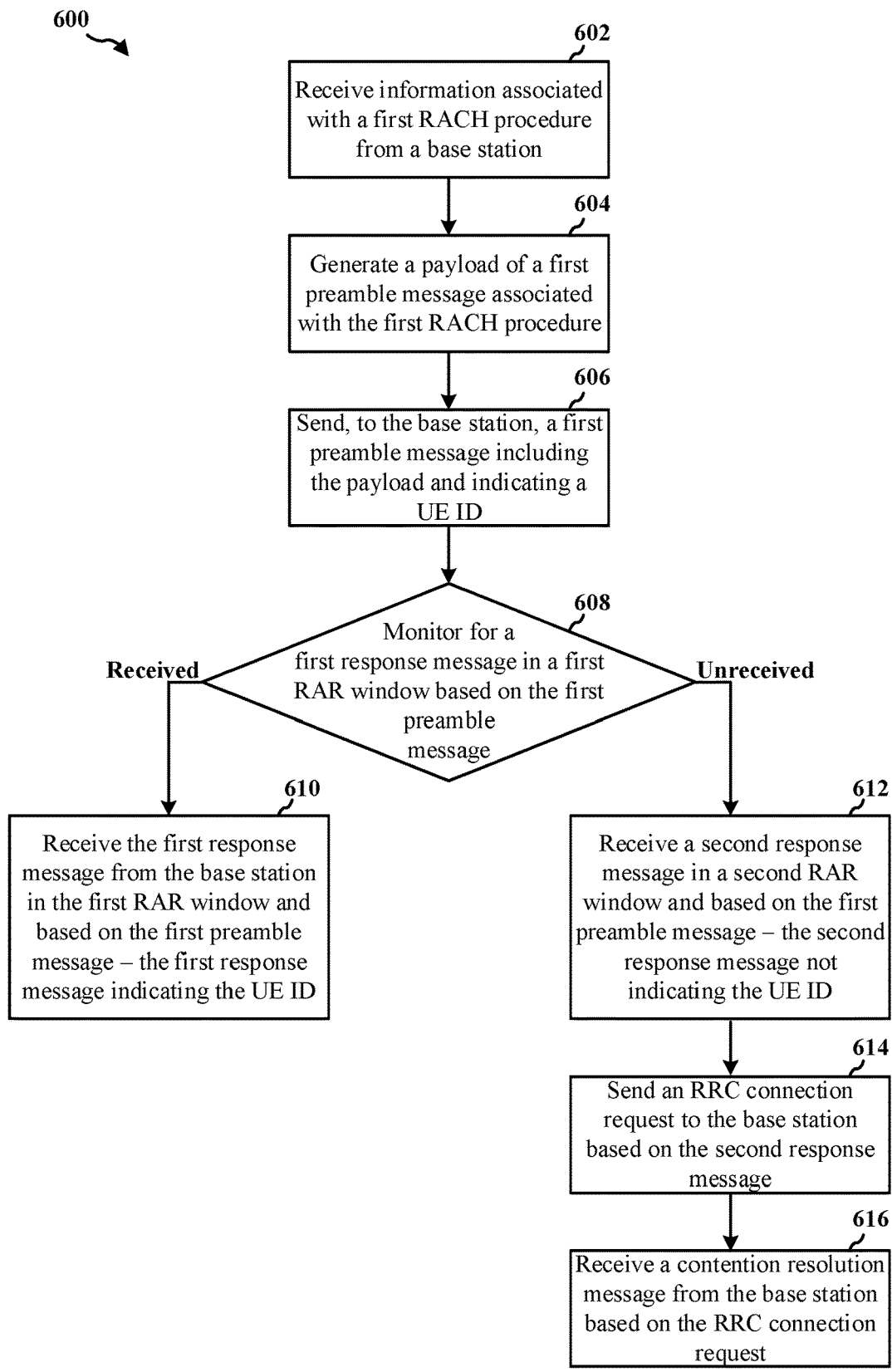
FIG. 6 is a flowchart of an example method of wireless communication for a RACH procedure with prioritization.

FIG. 6 is a flowchart of a method 600 of wireless communication. The method 600 may be performed by a UE (e.g., the UE 104, 350, 404, 504; the apparatus 802/802'; the processing system 914, which may include the memory 360 and which may be the entire UE 104, 350, 404, 504 or a component of the UE 104, 350, 404, 504, such as the TX processor 368, the RX processor 356, and/or the controller/processor 359). According to various aspects, one or more of the illustrated operations may be omitted, transposed, and/or contemporaneously performed.

First at operation 602, the UE may receive information associated with a first RACH procedure from a base station. When the UE is operating in an RRC Idle mode or an RRC Inactive mode, the UE may receive at least a portion of the information in at least one SIB. When the UE is operating in an RRC Connected mode, the UE may receive at least a portion of the information via RRC signaling. For example, referring to FIG. 5, the UE 504 may receive the RACH information 522 from the base station 502.

The information may be associated with at least a first priority of the first RACH procedure, which may be a two-step RACH procedure. For example, the information may indicate that the base station supports the first priority and a second priority associated with a second RACH procedure (e.g., a four-step RACH procedure), and the first priority may be relatively higher than the second priority. Further, the information may indicate a first set of parameters associated with the higher-priority first RACH procedure, and one or more parameters of the first set of parameters may be different from a corresponding one or more parameters of a second set of parameters associated with the lower-priority second RACH procedure.

In various aspects, the information may indicate a first duration of a first RAR window associated with the higher-priority first RACH procedure. The first duration may be shorter than a second duration of a second RAR window associated with the lower-priority second RACH procedure. The information may additionally indicate a first power-ramping step and/or a first backoff interval for the reattempting the first RACH procedure. The first power-ramping step may be different from (e.g., greater than) a second power-ramping step associated with the second RACH procedure and/or the first backoff interval may be different from (e.g., shorter than) a second backoff interval associated with the second RACH procedure.

At operation 604, the UE may generate a payload of a first preamble message associated with the first RACH procedure. The UE may generate the payload to indicate the higher priority associated with the first preamble message for the first RACH procedure. For example, referring to FIG. 5, the UE 504 may generate a payload of the preamble message 526, and the UE 504 may include an indication of the higher priority associated with the preamble message 526 in the payload of the first preamble message 526.

According to various aspects, the first RACH procedure may be associated with one of handover or beam failure recovery. For example, the UE may determine that the UE should perform the higher-priority first RACH procedure when the UE detects failure of a serving beam through which the UE communicates with the base station, or when the UE detects handover to the base station.

At operation 606, the UE may send a first preamble message (e.g., msgA) to the base station. The UE may indicate an ID of the UE in the first preamble message. Further, the UE may send information (e.g., the payload) of the preamble message on a PUSCH. For example, referring to FIG. 5, the UE 504 may send the preamble message 526 to the base station 502, and the UE 504 may indicate an ID of the UE 504 in the preamble message 526.

At operation 608, the UE may monitor a common search space for a first response message in the first RAR window based on the first preamble message. For example, the UE may set a timer based on the first duration of the first RAR window, and the UE may begin the timer when the UE sends the first preamble message. The UE may then monitor a set of resources (e.g., a set of resources on a RACH) while the timer is within the first duration of the first RAR window. Referring to FIG. 5, the UE 504 may monitor for the response message 528 in the first RAR window 510.

According to the method 600, the method 600 may proceed to operation 610 if the UE receives a message within the first RAR window and the message includes the UE ID indicated in the first preamble message. At operation 610, the UE may receive a first response message (e.g., msgB) in the first RAR window and the first response message may indicate the UE ID. For example, referring to FIG. 5, the UE 504 may receive the response message 528 in the first RAR window 510, and the response message 528 may indicate the ID of the UE 504.

The UE may receive the first response message on a PDCCH and a PDSCH. The UE may determine a timing advance and/or an uplink grant from the first response message, and the UE may apply the timing advance to acquire uplink timing synchronization and/or communicate with the base station according to the uplink grant. The first RACH procedure may be completed when the UE receives the first response message including the UE ID in the first RAR window.

If the UE does not receive a message within the first RAR window, the UE may continue monitoring the common search space during the second RAR window. If the UE receives a message within the second RAR window (outside of the first RAR window) and/or the message does not include the UE ID indicated in the first preamble message, the method 600 may proceed to operation 612.

At operation 612, the UE may receive a second response message (e.g., MSG2) associated with the second RACH procedure from the base station. For example, the second response message may be associated with a lower-priority, four-step RACH procedure because the second response message is received outside the first RAR window and in the second RAR window. In another example, the second response message may be associated with a lower-priority, four-step RACH procedure because the second response message does not indicate the UE ID. However, the second response message may include a timing advance and/or an uplink grant. For example, referring to FIG. 5, the UE 504 may receive the MSG2 530 in the second RAR window 512 (outside the first RAR window 510).

At operation 614, the UE may send an RRC connection request message (e.g., MSG3) to the base station based on the second response message. The RRC connection request message may be associated with the lower-priority second RACH procedure. The UE may send at least a portion of the RRC connection request message to the base station on a PUSCH. For example, referring to FIG. 5, the UE 504 may send the MSG3 532 to the base station 502 based on the MSG2 530.

At operation 616, the UE may receive a contention resolution message from the base station based on the RRC connection request message. The second RACH procedure may be completed when the UE receives the contention resolution message. Accordingly, the UE may communicate with the base station when the second RACH procedure is completed. For example, referring to FIG. 5, the UE 504 may receive the MSG4 534 from the base station 502 based on the MSG3 532.

If the UE is unable to complete the first RACH procedure and the second RACH procedure (e.g., if neither the first response message nor the second response message is received in the first RAR window or the second RAR window, respectively), the UE may reattempt the first RACH procedure. For example, the UE may apply one or more parameters received in the information associated with the first RACH procedure when reattempting the first RACH procedure. Thus, the UE may wait for a time period corresponding to the first backoff interval, and then UE may resend the first preamble message with a transmission power corresponding to the first power ramping step (e.g., the UE may return to operation 606 to reattempt the first RACH procedure based on information associated with the first RACH procedure received according to operation 604).

Figure 7:
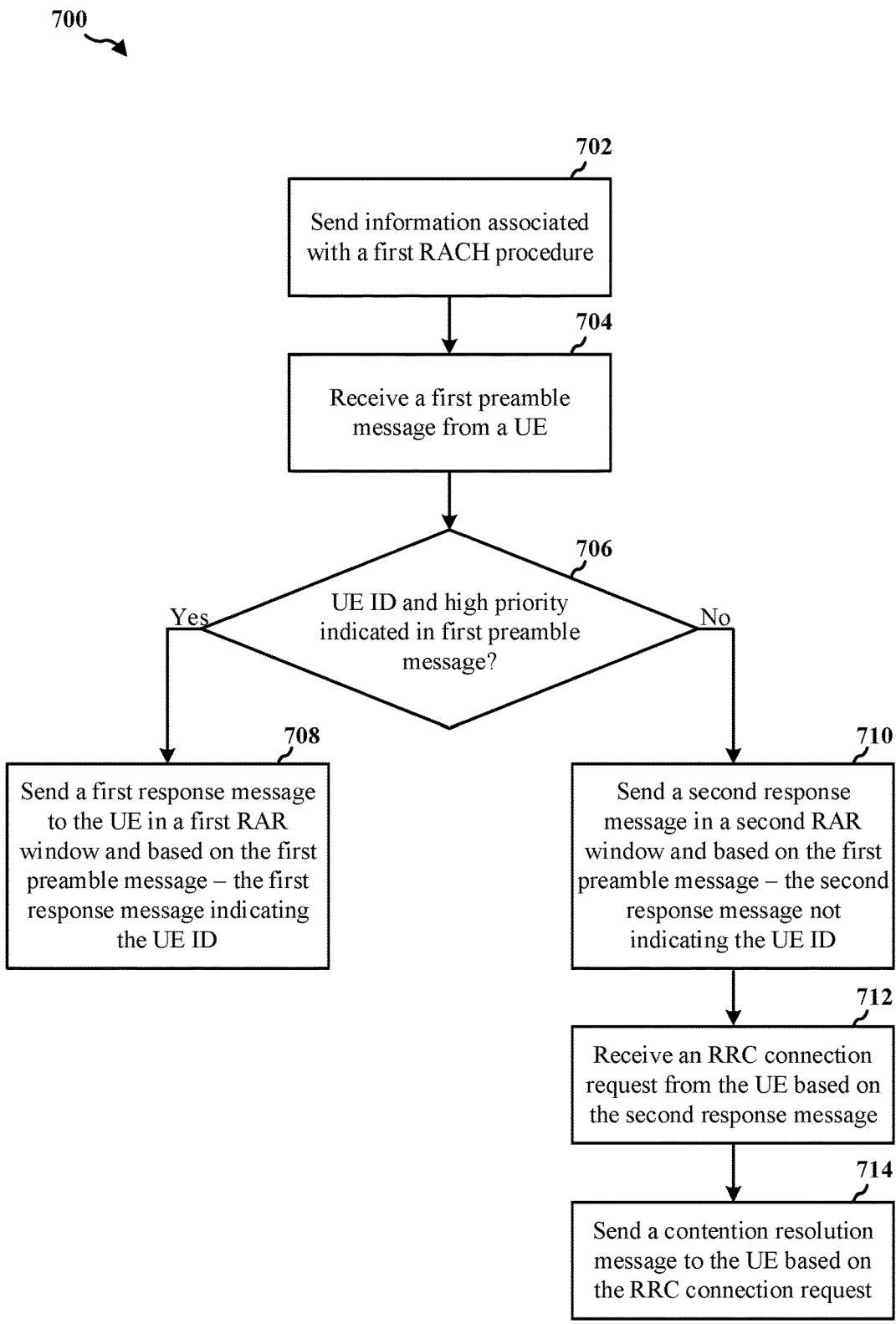
FIG. 7 is a flowchart of another example method of wireless communication for a RACH procedure with prioritization.

FIG. 7 is a flowchart of a method 700 of wireless communication. The method 700 may be performed by a base station (e.g., the base station 102/180, 310, 402, 502; the apparatus 1002/1002'; the processing system 1114, which may include the memory 376 and which may be the entire base station 102/180, 310, 402, 502 or a component of the base station 102/180, 310, 402, 502, such as the TX processor 316, the RX processor 370, and/or the controller/processor 375). According to various aspects, one or more of the illustrated operations may be omitted, transposed, and/or contemporaneously performed.

First at operation 702, the base station may send information associated with a first RACH procedure. The base station may send at least a portion of the information in at least one SIB (e.g., when a UE is operating in an RRC Idle mode or an RRC Inactive mode). When a UE is operating in an RRC Connected mode, the base station may send at least a portion of the information via RRC signaling. For example, referring to FIG. 5, the base station 502 may send the RACH information 522, e.g., in at least one SIB and/or in one or more RRC messages to the UE 504.

The information may be associated with at least a first priority of the first RACH procedure, which may be a two-step RACH procedure. For example, the information may indicate that the base station supports the first priority and a second priority associated with a second RACH procedure (e.g., a four-step RACH procedure), and the first priority may be relatively higher than the second priority. Further, the information may indicate a first set of parameters associated with the higher-priority first RACH procedure, and one or more parameters of the first set of parameters may be different from a corresponding one or more parameters of a second set of parameters associated with the lower-priority second RACH procedure.

In various aspects, the information may indicate a first duration of a first RAR window associated with the higher-priority first RACH procedure. The first duration may be shorter than a second duration of a second RAR window associated with the lower-priority second RACH procedure. The information may additionally indicate a first power-ramping step and/or a first backoff interval for the reattempting the first RACH procedure. The first power-ramping step may be different from (e.g., greater than) a second power-ramping step associated with the second RACH procedure and/or the first backoff interval may be different from (e.g., shorter than) a second backoff interval associated with the second RACH procedure.

At operation 704, the base station may receive a first preamble message (e.g., msgA) from a UE. In some aspects, at least a portion of the first preamble message may be on a PUSCH (e.g., the payload of the first preamble message). When the base station receives the first preamble message, the base station may begin at least one timer to measure the time for responding in the first RAR window and/or the second RAR window. For example, referring to FIG. 5, the base station 502 may receive the preamble message 526 from the UE 504.

At operation 706, the base station may determine whether the first preamble message includes a payload indicating the first preamble message for the first RACH procedure is associated with a higher priority than the second RACH procedure. Further, the base station may determine whether the first preamble message indicates an ID of the UE. For example, the base station may decode the first preamble message, and search for an indication of priority and/or a UE ID. If the base station is unable to successfully decode at least a portion of the first preamble message and does not find the indication of priority and/or UE ID because of the unsuccessful decode, the base station may determine the first preamble message should be assigned to the lower-priority second RACH procedure. Referring to FIG. 5, the base station 502 may determine whether the first preamble message 526 indicates the ID of the UE 504 and/or includes a payload indicating the higher priority associated with the first preamble message 526.

If the base station determines that the first preamble message indicates that the first preamble message is associated with the higher priority and/or if the base station determines that the first preamble message indicates the UE ID, then the base station may determine the first preamble message should be assigned to the higher-priority first RACH procedure. Accordingly, the method 700 may proceed to operation 708.

At operation 708, the base station may send a first response message to the UE in the first RAR window. For example, the base station may determine the at least one timer, started when the first preamble message was received, is within the first duration of the first RAR window. The base station may generate the first response message to indicate the UE ID from the first preamble message. In some aspects, the base station may determine a timing advance and/or uplink grant based on the first preamble message, and the base station may include the timing advance and/or uplink grant in the first response message. Referring to FIG. 5, the base station 502 may send the response message 528 in the first RAR window 510.

Alternatively, at operation 706, if the base station determines that the first preamble message does not indicate the first preamble message is associated with the higher priority and/or if the base station determines that the first preamble message does not indicate the UE ID, then the method 700 may proceed to operation 710. At operation 710, the base station may send a second response message (e.g., MSG2) associated with the second RACH procedure in the second RAR window (outside of the first RAR window). For example, the second response message may be associated with a lower-priority, four-step RACH procedure because the second response message is sent outside the first RAR window and in the second RAR window. The second response message may not indicate the UE ID. However, the second response message may include a timing advance and/or an uplink grant. For example, referring to FIG. 5, the base station 502 may send the MSG2 530 to the UE 504 in the second RAR window 512 (outside the first RAR window 510).

At operation 712, the base station may receive an RRC connection request message (e.g., MSG3) from the UE based on the second response message. The RRC connection request message may be associated with the lower-priority second RACH procedure. The base station may receive at least a portion of the RRC connection request message from the UE on a PUSCH. For example, referring to FIG. 5, the base station 502 may receive the MSG3 532 from the UE 504 based on the MSG2 530.

At operation 714, the base station may send a contention resolution message to the UE based on the RRC connection request. The second RACH procedure may be completed when the UE receives the contention resolution message. Accordingly, the base station may receive uplink communication from the UE when the second RACH procedure is completed. For example, referring to FIG. 5, the base station 502 may send the MSG4 534 to the UE 504 based on the MSG3 532.

Figure 8:
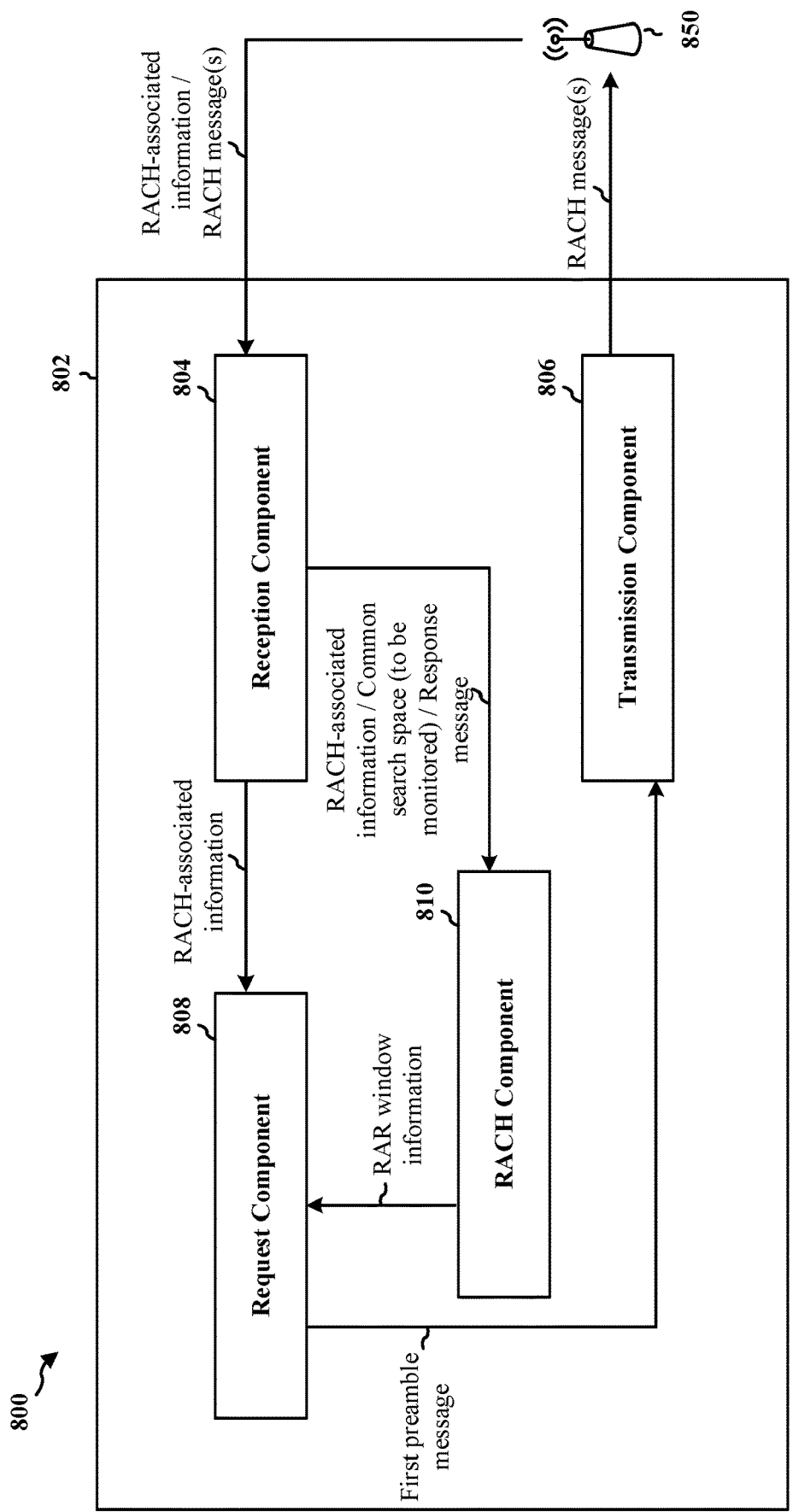
FIG. 8 is a conceptual data flow diagram illustrating an example data flow between different means/components in an example apparatus.

FIG. 8 is a conceptual data flow diagram 800 illustrating the data flow between different means/components in an example apparatus 802. The apparatus 802 may be a UE. The apparatus 802 includes a reception component 804 that is configured to receive information associated with a first RACH procedure from a base station 850, e.g., as described in connection with operation 602 of FIG. 6. When the apparatus 802 is operating in an RRC Idle mode or an RRC Inactive mode, the reception component 804 may receive at least a portion of the information in at least one SIB. When the apparatus 802 is operating in an RRC Connected mode, the reception component 804 may receive at least a portion of the information via RRC signaling.

The RACH-associated information may be associated with at least a first priority of the first RACH procedure, which may be a two-step RACH procedure. For example, the information may indicate that the base station 850 supports the first priority and a second priority associated with a second RACH procedure (e.g., a four-step RACH procedure), and the first priority may be relatively higher than the second priority. Further, the information may indicate a first set of parameters associated with the higher-priority first RACH procedure, and one or more parameters of the first set of parameters may be different from a corresponding one or more parameters of a second set of parameters associated with the lower-priority second RACH procedure.

In various aspects, the information may indicate a first duration of a first RAR window associated with the higher-priority first RACH procedure. The first duration may be shorter than a second duration of a second RAR window associated with the lower-priority second RACH procedure. The information may additionally indicate a first power-ramping step and/or a first backoff interval for the reattempting the first RACH procedure. The first power-ramping step may be different from (e.g., greater than) a second power-ramping step associated with the second RACH procedure and/or the first backoff interval may be different from (e.g., shorter than) a second backoff interval associated with the second RACH procedure.

The apparatus 802 may further include a request component 808 configured to generate a payload of a first preamble message associated with the first RACH procedure, e.g., as described in connection with operation 604 of FIG. 6. The request component 808 may be configured to generate the payload to indicate the higher priority associated with the first preamble message for the first RACH procedure. The request component 808 may be configured to generate the first preamble message to indicate an ID of the apparatus 802 (e.g., in the payload).

According to various aspects, the first RACH procedure may be associated with one of handover or beam failure recovery. For example, the request component 808 may determine that the apparatus 802 should perform the higher-priority first RACH procedure when the request component 808 detects failure of a serving beam through which the apparatus 802 communicates with the base station 850, or when the request component 808 detects handover to the base station 850.

The apparatus 802 may further include a transmission component 806 configured to transmit the first preamble message (e.g., msgA) to the base station 850, e.g., as described in connection with operation 606 of FIG. 6. The transmission component 806 may transmit at least a portion (e.g., the payload) of the first preamble message on an uplink data channel (e.g., a PUSCH).

The apparatus 802 may further include a RACH component 810 configured to monitor a common search space for a first response message in the first RAR window based on the first preamble message, e.g., as described in connection with operation 608 of FIG. 6. In one aspect, the RACH component 810 may be configured to receive the first response message (e.g., msgB) in the first RAR window and the first response message may indicate the ID of the apparatus 802, e.g., as described in connection with operation 610 of FIG. 6. The RACH component 810 may receive the first response message on a PDCCH and a PDSCH.

The RACH component 810 may determine a timing advance and/or an uplink grant from the first response message, and the RACH component 810 may apply the timing advance to acquire uplink timing synchronization and/or communicate with the base station 850 according to the uplink grant. The first RACH procedure may be completed when the RACH component 810 receives the first response message including the ID of the apparatus 802 in the first RAR window (and subsequently transmits acknowledgement (ACK) feedback to the base station 850 in response to successfully receiving the first response message).

If the RACH component 810 does not receive a message within the first RAR window, the RACH component 810 may continue monitoring the common search space during the second RAR window. The RACH component 810 may be further configured to receive a second response message (e.g., MSG2) associated with the second RACH procedure from the base station 850, e.g., as described in connection with operation 612 of FIG. 6. For example, the second response message may be associated with a lower-priority, four-step RACH procedure because the second response message is received outside the first RAR window and in the second RAR window. In another example, the second response message may be associated with a lower-priority, four-step RACH procedure because the second response message does not indicate the ID of the apparatus 802. However, the second response message may include a timing advance and/or an uplink grant.

The transmission component 806 may be further configured to transmit an RRC connection request message (e.g., MSG3) to the base station 850 based on the second response message, e.g., as described in connection with operation 614 of FIG. 6. The RRC connection request message may be associated with the lower-priority second RACH procedure. The transmission component 806 may transmit at least a portion of the RRC connection request message to the base station 850 on a PUSCH.

The reception component 804 may be further configured to receive a contention resolution message from the base station 850 based on the RRC connection request message, e.g., as described in connection with operation 614 of FIG. 6. The second RACH procedure may be completed when the reception component 804 receives the contention resolution message (and the transmission component 806 subsequently transmits ACK feedback in response to successfully receiving the contention resolution message). Accordingly, the apparatus 802 may communicate with the base station 850 when the second RACH procedure is completed.

If the apparatus 802 is unable to complete the first RACH procedure and the second RACH procedure (e.g., if neither the first response message nor the second response message is received in the first RAR window or the second RAR window, respectively), the apparatus 802 may reattempt the first RACH procedure. For example, the request component 808 may apply one or more parameters received in the information associated with the first RACH procedure when reattempting the first RACH procedure. The request component 808 may wait for a time period corresponding to the first backoff interval, and then transmission component 806 may retransmit the first preamble message with a transmission power corresponding to the first power ramping step.

The apparatus 802 may include additional components that perform each of the blocks of the algorithm in the aforementioned flowchart of FIG. 6. As such, each block in the aforementioned flowchart of FIG. 6 may be performed by a component and the apparatus 802 may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 9:
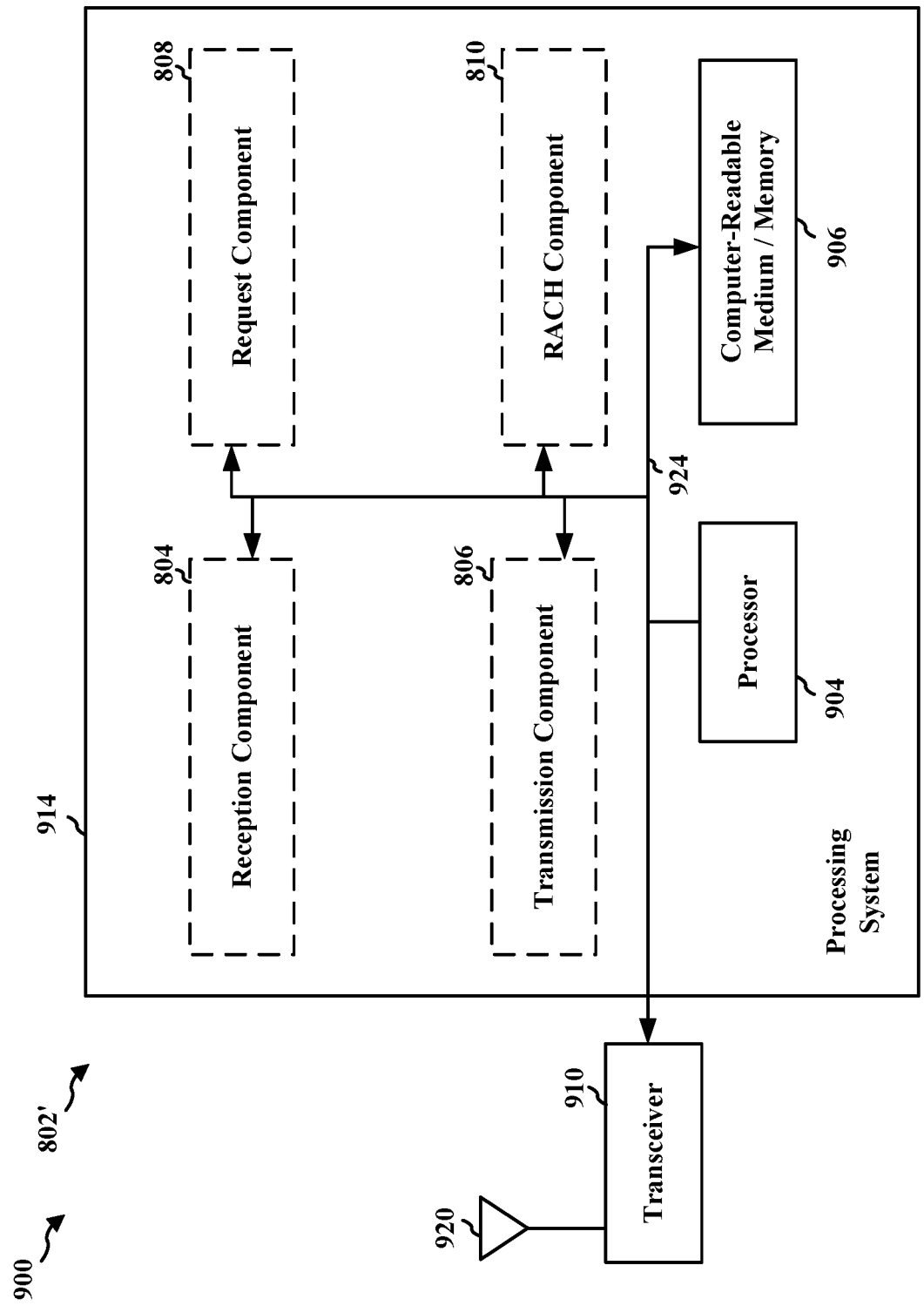
FIG. 9 is a diagram illustrating an example of a hardware implementation for an apparatus employing a processing system.

FIG. 9 is a diagram 900 illustrating an example of a hardware implementation for an apparatus 802' employing a processing system 914. The processing system 914 may be implemented with a bus architecture, represented generally by the bus 924. The bus 924 may include any number of interconnecting buses and bridges depending on the specific application of the processing system 914 and the overall design constraints. The bus 924 links together various circuits including one or more processors and/or hardware components, represented by the processor 904, the components 804, 806, 808, 810 and the computer-readable medium/memory 906. The bus 924 may also link various other circuits such as timing sources, peripherals, voltage regulators, and power management circuits, which are well known in the art, and therefore, will not be described any further.

The processing system 914 may be coupled to a transceiver 910. The transceiver 910 is coupled to one or more antennas 920. The transceiver 910 provides a means for communicating with various other apparatus over a transmission medium. The transceiver 910 receives a signal from the one or more antennas 920, extracts information from the received signal, and provides the extracted information to the processing system 914, specifically the reception component 804. In addition, the transceiver 910 receives information from the processing system 914, specifically the transmission component 806, and based on the received information, generates a signal to be applied to the one or more antennas 920. The processing system 914 includes a processor 904 coupled to a computer-readable medium/memory 906. The processor 904 is responsible for general processing, including the execution of software stored on the computer-readable medium/memory 906. The software, when executed by the processor 904, causes the processing system 914 to perform the various functions described supra for any particular apparatus. The computer-readable medium/memory 906 may also be used for storing data that is manipulated by the processor 904 when executing software. The processing system 914 further includes at least one of the components 804, 806, 808, 810. The components may be software components running in the processor 904, resident/stored in the computer readable medium/memory 906, one or more hardware components coupled to the processor 904, or some combination thereof. The processing system 914 may be a component of the UE 350 and may include the memory 360 and/or at least one of the TX processor 368, the RX processor 356, and the controller/processor 359. Alternatively, the processing system 914 may be the entire UE (e.g., see 350 of FIG. 3).

In one configuration, the apparatus 802/802' for wireless communication includes means for generating a payload of a first preamble message associated with a first RACH procedure, and the payload indicates a first priority of the first RACH procedure that is relatively higher than a second priority of a second RACH procedure; and means for sending the first preamble message including a RACH preamble and the payload to a base station, and the first preamble message indicates an ID of the apparatus 802/802'. In one aspect, the first RACH procedure is associated with one of handover or beam failure recovery, and the second RACH procedure is associated with initial access.

The apparatus 802/802' may further include means for monitoring for a first response message in a first RAR window and based on the first preamble message, and the first RAR window has a shorter duration than a second RAR window associated with the second RACH procedure. The apparatus 802/802' may further include means for receiving the first response message in the first RAR window and based on the first preamble message, and the first response message indicates the ID of the apparatus 802/802'. The apparatus 802/802' may further include means for receiving a second response message associated with the second RACH procedure in the second RAR window when the first response message is undetected in the first RAR window and based on the first preamble message, and the ID of the apparatus 802/802' is unindicated in the second response message; means for sending a RRC connection request to the base station based on the second response message, and the RRC connection request includes information in a PUSCH; and means for receiving a contention resolution message from the base station based on the RRC connection request.

The apparatus 802/802' may further include means for receiving information associated with the first priority and the second priority from the base station. In one aspect, the information indicates the base station supports at least the first priority and the second priority. In one aspect, the information indicates a first duration of a first RAR window associated with the first RACH procedure, the first duration being shorter than a second duration of a second RAR window associated with the second RACH procedure.

In one aspect, the information indicates at least one of a first power-ramping step or a first backoff interval associated with retransmission of the first preamble message for the first RACH procedure, and the at least one of a first power-ramping step or first backoff interval is different from a respective one of a second power-ramping step or a second backoff interval associated with retransmission of a second preamble message for the second RACH procedure. In one aspect, the information is received in at least one SIB when the apparatus 802/802' is operating in an RRC Idle mode or an RRC Inactive mode, and the information is received via RRC signaling when the apparatus 802/802' is operating in an RRC Connected mode. In one aspect, the first RACH procedure includes a two-step RACH procedure and the second RACH procedure includes a four-step RACH procedure.

The aforementioned means may be one or more of the aforementioned components of the apparatus 802 and/or the processing system 914 of the apparatus 802' configured to perform the functions recited by the aforementioned means. As described supra, the processing system 914 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

Figure 10:
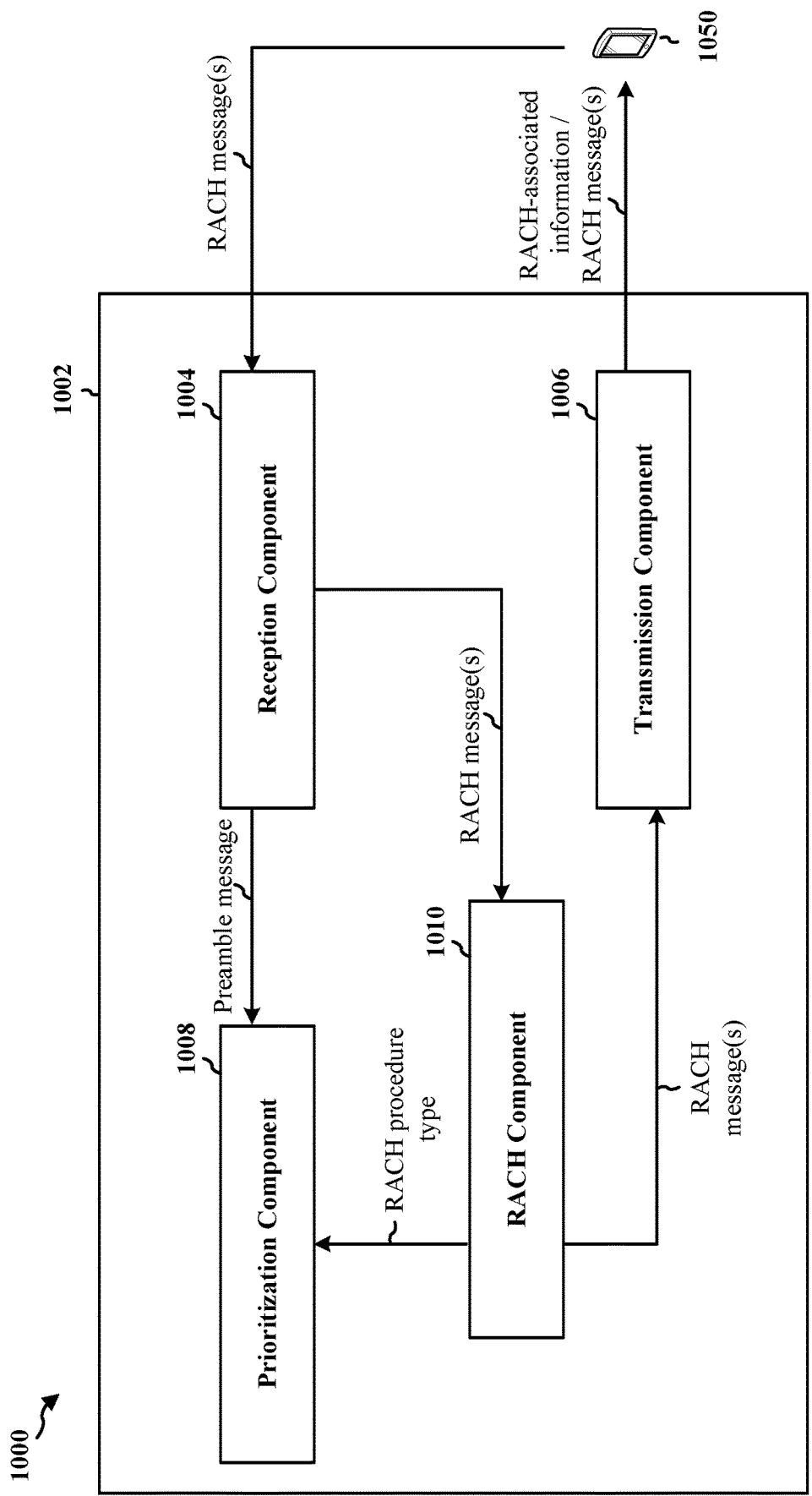
FIG. 10 is a conceptual data flow diagram illustrating another example data flow between different means/components in another example apparatus.

FIG. 10 is a conceptual data flow diagram 1000 illustrating the data flow between different means/components in an example apparatus 1002. The apparatus 1002 may be a base station. The apparatus 1002 includes a transmission component 1006 may be configured to transmit information associated with a first RACH procedure, e.g., as described in connection with operation 702 of FIG. 7. The transmission component 1006 may transmit at least a portion of the information in at least one SIB (e.g., when a UE 1050 is operating in an RRC Idle mode or an RRC Inactive mode). When a UE 1050 is operating in an RRC Connected mode, the transmission component 1006 may transmit at least a portion of the information via RRC signaling.

The information may be associated with at least a first priority of the first RACH procedure, which may be a two-step RACH procedure. For example, the information may indicate that the apparatus 1002 supports the first priority and a second priority associated with a second RACH procedure (e.g., a four-step RACH procedure), and the first priority may be relatively higher than the second priority. Further, the information may indicate a first set of parameters associated with the higher-priority first RACH procedure, and one or more parameters of the first set of parameters may be different from a corresponding one or more parameters of a second set of parameters associated with the lower-priority second RACH procedure.

In various aspects, the information may indicate a first duration of a first RAR window associated with the higher-priority first RACH procedure. The first duration may be shorter than a second duration of a second RAR window associated with the lower-priority second RACH procedure. The information may additionally indicate a first power-ramping step and/or a first backoff interval for the reattempting the first RACH procedure. The first power-ramping step may be different from (e.g., greater than) a second power-ramping step associated with the second RACH procedure and/or the first backoff interval may be different from (e.g., shorter than) a second backoff interval associated with the second RACH procedure.

The apparatus 1002 may further include a reception component 1004 configured to receive a first preamble message (e.g., msgA) from the UE 1050, e.g., as described in connection with operation 704 of FIG. 7. In some aspects, at least a portion of the first preamble message may be on a PUSCH (e.g., the payload of the first preamble message). When the reception component 1004 receives the first preamble message, a prioritization component 1008 may begin at least one timer to measure the time for responding in the first RAR window and/or the second RAR window.

The apparatus 1002 may further include a prioritization component 1008 configured to determine whether the first preamble message includes a payload indicating the first preamble message for the first RACH procedure is associated with a higher priority than the second RACH procedure, e.g., as described in connection with operation 706 of FIG. 7. Further, the prioritization component 1008 may determine whether the first preamble message indicates an ID of the UE 1050. For example, the prioritization component 1008 may decode the first preamble message, and search for an indication of priority and/or a UE ID. If the prioritization component 1008 is unable to successfully decode at least a portion of the first preamble message and does not find the indication of priority and/or UE ID because of the unsuccessful decode, the prioritization component 1008 may determine the first preamble message should be assigned to the lower-priority second RACH procedure.

If the prioritization component 1008 determines that the first preamble message indicates that the first preamble message is associated with the higher priority and/or if the prioritization component 1008 determines that the first preamble message indicates the UE ID, then the prioritization component 1008 may determine the first preamble message should be assigned to the higher-priority first RACH procedure.

For the higher-priority first RACH procedure, a RACH component 1010 may generate and the transmission component 1006 may transmit a first response message to the UE 1050 in the first RAR window, e.g., as described in connection with operation 708 of FIG. 7. For example, the RACH component 1010 may determine the at least one timer, started when the first preamble message was received, is within the first duration of the first RAR window. The RACH component 1010 may generate the first response message to indicate the UE ID from the first preamble message. In some aspects, the RACH component 1010 may determine a timing advance and/or uplink grant based on the first preamble message, and the RACH component 1010 may include the timing advance and/or uplink grant in the first response message.

If the prioritization component 1008 determines that the first preamble message does not indicate the first preamble message is associated with the higher priority and/or if the prioritization component 1008 determines that the first preamble message does not indicate the UE ID, then the prioritization component 1008 may determine the first preamble message should be assigned to the lower-priority second RACH procedure.

For the lower-priority second RACH procedure, the RACH component 1010 may generate and the transmission component 1006 may transmit a second response message (e.g., MSG2) associated with the second RACH procedure in the second RAR window (outside of the first RAR window), e.g., as described in connection with operation 710 of FIG. 7. For example, the second response message may be associated with a lower-priority, four-step RACH procedure because the second response message is sent outside the first RAR window and in the second RAR window. The second response message may not indicate the UE ID. However, the second response message may include a timing advance and/or an uplink grant.

The reception component 1004 may receive an RRC connection request message (e.g., MSG3) from the UE 1050 based on the second response message, e.g., as described in connection with operation 712 of FIG. 7. The RRC connection request message may be associated with the lower-priority second RACH procedure. The reception component 1004 may receive at least a portion of the RRC connection request message from the UE 1050 on a PUSCH.

Next, the RACH component 1010 may generate and the transmission component 1006 may transmit a contention resolution message to the UE 1050 based on the RRC connection request, e.g., as described in connection with operation 714 of FIG. 7. The second RACH procedure may be completed when the UE 1050 receives the contention resolution message (and the reception component 1004 receives ACK feedback indicating the LIE 1050 successfully received the contention resolution message). Accordingly, the apparatus 1002 may receive uplink communication from the UE 1050 when the second RACH procedure is completed.

The apparatus 1002 may include additional components that perform each of the blocks of the algorithm in the aforementioned flowchart of FIG. 7. As such, each block in the aforementioned flowchart of FIG. 7 may be performed by a component and the apparatus 1002 may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 11:
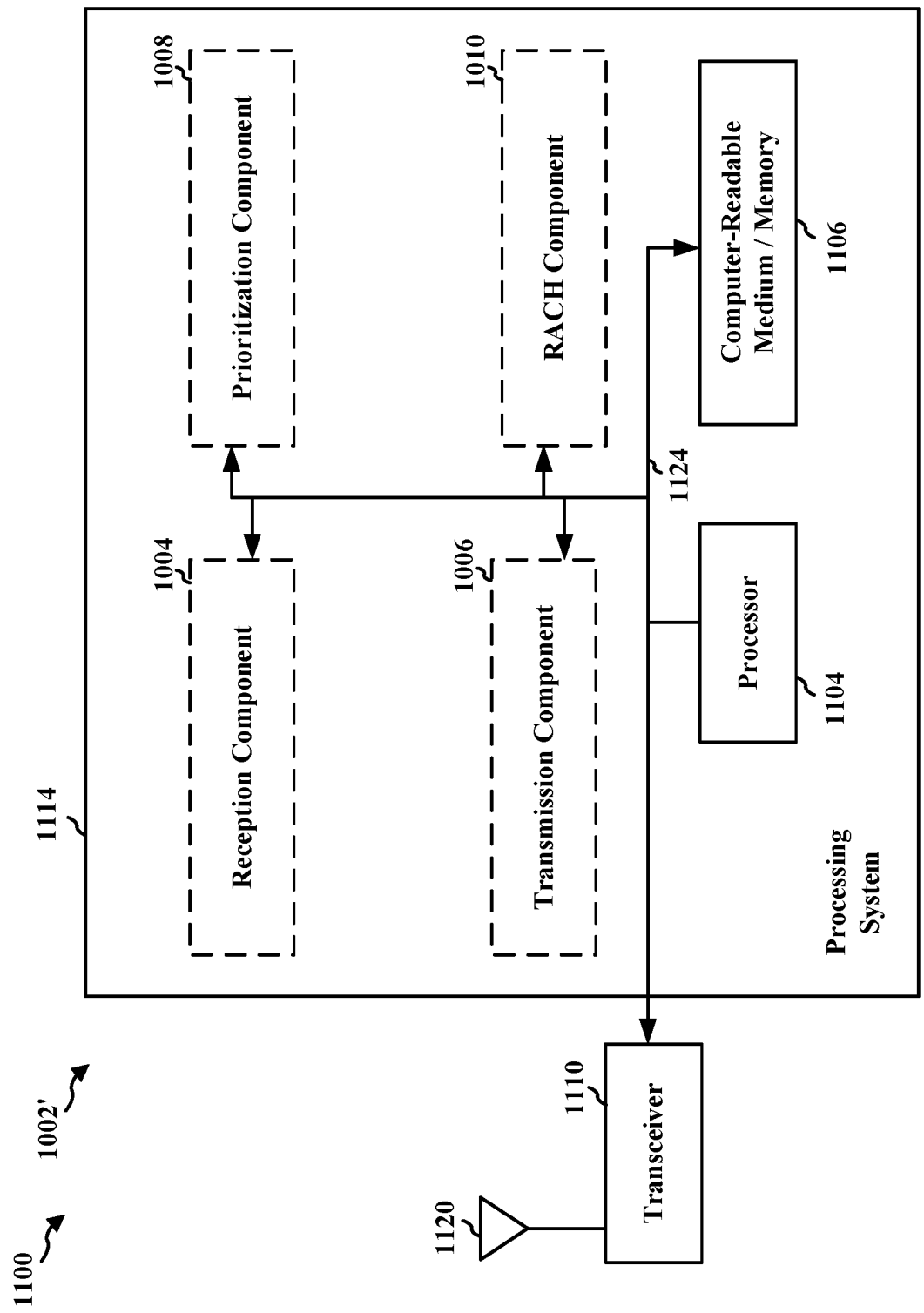
FIG. 11 is a diagram illustrating another example of a hardware implementation for an apparatus employing a processing system.

FIG. 11 is a diagram 1100 illustrating an example of a hardware implementation for an apparatus 1002' employing a processing system 1114. The processing system 1114 may be implemented with a bus architecture, represented generally by the bus 1124. The bus 1124 may include any number of interconnecting buses and bridges depending on the specific application of the processing system 1114 and the overall design constraints. The bus 1124 links together various circuits including one or more processors and/or hardware components, represented by the processor 1104, the components 1004, 1006, 1008, 1010 and the computer-readable medium/memory 1106. The bus 1124 may also link various other circuits such as timing sources, peripherals, voltage regulators, and power management circuits, which are well known in the art, and therefore, will not be described any further.

The processing system 1114 may be coupled to a transceiver 1110. The transceiver 1110 is coupled to one or more antennas 1120. The transceiver 1110 provides a means for communicating with various other apparatus over a transmission medium. The transceiver 1110 receives a signal from the one or more antennas 1120, extracts information from the received signal, and provides the extracted information to the processing system 1114, specifically the reception component 1004. In addition, the transceiver 1110 receives information from the processing system 1114, specifically the transmission component 1006, and based on the received information, generates a signal to be applied to the one or more antennas 1120. The processing system 1114 includes a processor 1104 coupled to a computer-readable medium/memory 1106. The processor 1104 is responsible for general processing, including the execution of software stored on the computer-readable medium/memory 1106. The software, when executed by the processor 1104, causes the processing system 1114 to perform the various functions described supra for any particular apparatus. The computer-readable medium/memory 1106 may also be used for storing data that is manipulated by the processor 1104 when executing software. The processing system 1114 further includes at least one of the components 1004, 1006, 1008, 1010. The components may be software components running in the processor 1104, resident/stored in the computer readable medium/memory 1106, one or more hardware components coupled to the processor 1104, or some combination thereof. The processing system 1114 may be a component of the base station 310 and may include the memory 376 and/or at least one of the TX processor 316, the RX processor 370, and the controller/processor 375. Alternatively, the processing system 1114 may be the entire base station (e.g., see 310 of FIG. 3).

In one configuration, the apparatus 1002/1002' for wireless communication includes means for receiving a first preamble message of a first RACH procedure from a UE, and the first preamble message indicates an ID of the UE, and a payload of the first preamble message indicates a first priority of a first RACH procedure that is relatively higher than a second priority of a second RACH procedure; and means for sending a first response message to the UE in a first RAR window based on the first preamble message, and the first response message indicates the ID of the UE based on the first priority of the first RACH procedure, the first RAR window having a first duration shorter than a second duration of a second RAR window of the second RACH procedure.

In one aspect, the first RACH procedure is associated with one of handover or beam failure recovery, and the second RACH procedure is associated with initial access. The apparatus 1002/1002' may further include means for sending information associated with the first priority and the second priority. In one aspect, the information indicates the base station supports at least the first priority and the second priority. In one aspect, the information indicates the first duration of the first RAR window and the second duration of the second RAR window. In one aspect, the information indicates at least one of a first power-ramping step or a first backoff interval associated with the first RACH procedure, the at least one of a first power-ramping step or first backoff interval being different from a respective one of a second power-ramping step or a second backoff interval associated with the second RACH procedure.

In one aspect, at least a portion of the information is sent via broadcast in at least one SIB. In one aspect, at least a portion of the information is sent to the UE via RRC signaling when the UE is operating in an RRC Connected mode. In one aspect, the first RACH procedure comprises a two-step RACH procedure and the second RACH procedure comprises a four-step RACH procedure.

The aforementioned means may be one or more of the aforementioned components of the apparatus 1002 and/or the processing system 1114 of the apparatus 1002' configured to perform the functions recited by the aforementioned means. As described supra, the processing system 1114 may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects, Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication by a user equipment (UE), the method comprising:
    generating a payload of a first preamble message associated with a first random access channel (RACH) procedure, wherein the payload indicates a first priority of the first RACH procedure that is relatively higher than a second priority of a second RACH procedure;
    sending the first preamble message including a RACH preamble and the payload to a base station, wherein the first preamble message indicates an identifier (ID) of the UE;
    monitoring for a first response message in a first random access response (RAR) window and based on the first preamble message, wherein the first RAR window has a shorter duration than a second RAR window associated with the second RACH procedure;
    receiving a second response message associated with the second RACH procedure in the second RAR window when the first response message is undetected in the first RAR window and based on the first preamble message, wherein the ID of the UE is unindicated in the second response message; and
    sending a radio resource control (RRC) connection request to the base station based on the second response message, wherein the RRC connection request includes information in a physical uplink shared channel (PUSCH); and
    receiving a contention resolution message from the base station based on the RRC connection request.

2. The method of claim 1, wherein the first RACH procedure is associated with one of handover or beam failure recovery, and the second RACH procedure is associated with initial access.

3. The method of claim 1, further comprising:
    receiving the first response message in the first RAR window and based on the first preamble message, wherein the first response message indicates the ID of the UE.

4. The method of claim 1, further comprising:
    receiving information associated with the first priority and the second priority from the base station.

5. The method of claim 4, wherein the information indicates the base station supports at least the first priority and the second priority.

6. The method of claim 4, wherein the information indicates a first duration of a first random access response (RAR) window associated with the first RACH procedure, the first duration being shorter than a second duration of a second RAR window associated with the second RACH procedure.

7. The method of claim 4, wherein the information indicates at least one of a first power-ramping step or a first backoff interval associated with retransmission of the first preamble message for the first RACH procedure, wherein the at least one of the first power-ramping step or the first backoff interval is different from a respective one of a second power-ramping step or a second backoff interval associated with retransmission of a second preamble message for the second RACH procedure.

8. The method of claim 4, wherein the information is received in at least one system information block (SIB) when the UE is operating in a radio resource control (RRC) Idle mode or an RRC Inactive mode, and wherein the information is received via RRC signaling when the UE is operating in an RRC Connected mode.

9. The method of claim 1, wherein the first RACH procedure comprises a two-step RACH procedure and the second RACH procedure comprises a four-step RACH procedure.

10. A method of wireless communication by a base station, the method comprising:
    receiving a first preamble message of a first random access channel (RACH) procedure from a user equipment (UE), wherein the first preamble message indicates an identifier (ID) of the UE, and wherein a payload of the first preamble message indicates a first priority of a first RACH procedure that is relatively higher than a second priority of a second RACH procedure;
    sending a first response message to the UE in a first random access response (RAR) window based on the first preamble message, wherein the first response message indicates the ID of the UE based on the first priority of the first RACH procedure, the first RAR window having a first duration shorter than a second duration of a second RAR window of the second RACH procedure;
    sending a second response message associated with the second RACH procedure in the second RAR window based on the first preamble message, wherein the ID of the UE is unindicated in the second response message; and
    receiving a radio resource control (RRC) connection request from the UE based on the second response message, wherein the RRC connection request includes information in a physical uplink shared channel (PUSCH); and
    sending a contention resolution message to the UE based on the RRC connection request.

11. The method of claim 10, wherein the first RACH procedure is associated with one of handover or beam failure recovery, and the second RACH procedure is associated with initial access.

12. The method of claim 10, further comprising:
    sending information associated with the first priority and the second priority.

13. The method of claim 12, wherein the information indicates the base station supports at least the first priority and the second priority.

14. The method of claim 12, wherein the information indicates the first duration of the first RAR window and the second duration of the second RAR window.

15. The method of claim 12, wherein the information indicates at least one of a first power-ramping step or a first backoff interval associated with the first RACH procedure, the at least one of the first power-ramping step or the first backoff interval being different from a respective one of a second power-ramping step or a second backoff interval associated with the second RACH procedure.

16. The method of claim 12, wherein at least a portion of the information is sent via broadcast in at least one system information block (SIB).

17. The method of claim 12, wherein at least a portion of the information is sent to the UE via radio resource control (RRC) signaling when the UE is operating in an RRC Connected mode.

18. The method of claim 10, wherein the first RACH procedure comprises a two-step RACH procedure and the second RACH procedure comprises a four-step RACH procedure.

19. An apparatus for wireless communication by a user equipment (UE), the apparatus comprising:
a memory; and
at least one processor coupled to the memory and configured to:
generate a payload of a first preamble message associated with a first random access channel (RACH) procedure, wherein the payload indicates a first priority of the first RACH procedure that is relatively higher than a second priority of a second RACH procedure;
send the first preamble message including a RACH preamble and the payload to a base station, wherein the first preamble message indicates an identifier (ID) of the UE;
monitor for a first response message in a first random access response (RAR) window and based on the first preamble message, wherein the first RAR window has a shorter duration than a second RAR window associated with the second RACH procedure;
receive a second response message associated with the second RACH procedure in the second RAR window when the first response message is undetected in the first RAR window and based on the first preamble message, wherein the ID of the UE is unindicated in the second response message; and
send a radio resource control (RRC) connection request to the base station based on the second response message, wherein the RRC connection request includes information in a physical uplink shared channel (PUSCH); and
receive a contention resolution message from the base station based on the RRC connection request.

20. The apparatus of claim 19, wherein the first RACH procedure is associated with one of handover or beam failure recovery, and the second RACH procedure is associated with initial access.

21. The apparatus of claim 19, wherein the at least one processor is further configured to:
receive the first response message in the first RAR window and based on the first preamble message, wherein the first response message indicates the ID of the UE.

22. The apparatus of claim 19, wherein the at least one processor is further configured to:
receive information associated with the first priority and the second priority from the base station.

23. The apparatus of claim 22, wherein the information indicates the base station supports at least the first priority and the second priority.

24. The apparatus of claim 22, wherein the information indicates a first duration of a first random access response (RAR) window associated with the first RACH procedure, the first duration being shorter than a second duration of a second RAR window associated with the second RACH procedure.

25. The apparatus of claim 22, wherein the information indicates at least one of a first power-ramping step or a first backoff interval associated with retransmission of the first preamble message for the first RACH procedure, wherein the at least one of the first power-ramping step or the first backoff interval is different from a respective one of a second power-ramping step or a second backoff interval associated with retransmission of a second preamble message for the second RACH procedure.

26. The apparatus of claim 22, wherein the information is received in at least one system information block (SIB) when the UE is operating in a radio resource control (RRC) Idle mode or an RRC Inactive mode, and wherein the information is received via RRC signaling when the UE is operating in an RRC Connected mode.

27. The apparatus of claim 19, wherein the first RACH procedure comprises a two-step RACH procedure and the second RACH procedure comprises a four-step RACH procedure.

28. An apparatus for wireless communication by a base station, the apparatus comprising:
a memory; and
at least one processor coupled to the memory and configured to:
receive a first preamble message of a first random access channel (RACH) procedure from a user equipment (UE), wherein the first preamble message indicates an identifier (ID) of the UE, and wherein a payload of the first preamble message indicates a first priority of a first RACH procedure that is relatively higher than a second priority of a second RACH procedure;
send a first response message to the UE in a first random access response (RAR) window based on the first preamble message, wherein the first response message indicates the ID of the UE based on the first priority of the first RACH procedure, the first RAR window having a first duration shorter than a second duration of a second RAR window of the second RACH procedure;
send a second response message associated with the second RACH procedure in the second RAR window based on the first preamble message, wherein the ID of the UE is unindicated in the second response message; and
receive a radio resource control (RRC) connection request from the UE based on the second response message, wherein the RRC connection request includes information in a physical uplink shared channel (PUSCH); and
send a contention resolution message to the UE based on the RRC connection request.

29. The apparatus of claim 28, wherein the first RACH procedure is associated with one of handover or beam failure recovery, and the second RACH procedure is associated with initial access.

30. The apparatus of claim 28, wherein the at least one processor is further configured to:
send information associated with the first priority and the second priority.

31. The apparatus of claim 30, wherein the information indicates the base station supports at least the first priority and the second priority.

32. The apparatus of claim 30, wherein the information indicates the first duration of the first RAR window and the second duration of the second RAR window.

33. The apparatus of claim 30, wherein the information indicates at least one of a first power-ramping step or a first backoff interval associated with the first RACH procedure, the at least one of the first power-ramping step or the first backoff interval being different from a respective one of a second power-ramping step or a second backoff interval associated with the second RACH procedure.

34. The apparatus of claim 30, wherein at least a portion of the information is sent via broadcast in at least one system information block (SIB).

35. The apparatus of claim 30, wherein at least a portion of the information is sent to the UE via radio resource control (RRC) signaling when the UE is operating in an RRC Connected mode.

36. The apparatus of claim 28, wherein the first RACH procedure comprises a two-step RACH procedure and the second RACH procedure comprises a four-step RACH procedure.

37. An apparatus for wireless communication by a user equipment (UE), the apparatus comprising:
- means for generating a payload of a first preamble message associated with a first random access channel (RACH) procedure, wherein the payload indicates a first priority of the first RACH procedure that is relatively higher than a second priority of a second RACH procedure; means for sending the first preamble message including a RACH preamble and the payload to a base station, wherein the first preamble message indicates an identifier (ID) of the UE;
- means for monitoring for a first response message in a first random access response (RAR) window and based on the first preamble message, wherein the first RAR window has a shorter duration than a second RAR window associated with the second RACH procedure;
- means for receiving a second response message associated with the second RACH procedure in the second RAR window when the first response message is undetected in the first RAR window and based on the first preamble message, wherein the ID of the UE is unindicated in the second response message;
- means for sending a radio resource control (RRC) connection request to the base station based on the second response message, wherein the RRC connection request includes information in a physical uplink shared channel (PUSCH); and
- means for receiving a contention resolution message from the base station based on the RRC connection request.

38. The apparatus of claim 37, wherein the first RACH procedure is associated with one of handover or beam failure recovery, and the second RACH procedure is associated with initial access.

39. The apparatus of claim 37, further comprising:
- means for receiving the first response message in the first RAR window and based on the first preamble message, wherein the first response message indicates the ID of the UE.

40. The apparatus of claim 37, further comprising:
- means for receiving information associated with the first priority and the second priority from the base station.

41. The apparatus of claim 40, wherein the information indicates the base station supports at least the first priority and the second priority.

42. The apparatus of claim 40, wherein the information indicates a first duration of a first random access response (RAR) window associated with the first RACH procedure, the first duration being shorter than a second duration of a second RAR window associated with the second RACH procedure.

43. The apparatus of claim 40, wherein the information indicates at least one of a first power-ramping step or a first backoff interval associated with retransmission of the first preamble message for the first RACH procedure, wherein the at least one of the first power-ramping step or the first backoff interval is different from a respective one of a second power-ramping step or a second backoff interval associated with retransmission of a second preamble message for the second RACH procedure.

44. The apparatus of claim 40, wherein the information is received in at least one system information block (SIB) when the UE is operating in a radio resource control (RRC) Idle mode or an RRC Inactive mode, and wherein the information is received via RRC signaling when the UE is operating in an RRC Connected mode.

45. The apparatus of claim 37, wherein the first RACH procedure comprises a two-step RACH procedure and the second RACH procedure comprises a four-step RACH procedure.

46. An apparatus for wireless communication by a base station, the apparatus comprising:
- means for receiving a first preamble message of a first random access channel (RACH) procedure from a user equipment (UE), wherein the first preamble message indicates an identifier (ID) of the UE, and wherein a payload of the first preamble message indicates a first priority of a first RACH procedure that is relatively higher than a second priority of a second RACH procedure; and
- means for sending a first response message to the UE in a first random access response (RAR) window based on the first preamble message, wherein the first response message indicates the ID of the UE based on the first priority of the first RACH procedure, the first RAR window having a first duration shorter than a second duration of a second RAR window of the second RACH procedure;
- means for sending a second response message associated with the second RACH procedure in the second RAR window based on the first preamble message, wherein the ID of the UE is unindicated in the second response message; and
- means for receiving a radio resource control (RRC) connection request from the UE based on the second response message, wherein the RRC connection request includes information in a physical uplink shared channel (PUSCH); and
- means for sending a contention resolution message to the UE based on the RRC connection request.

47. The apparatus of claim 46, wherein the first RACH procedure is associated with one of handover or beam failure recovery, and the second RACH procedure is associated with initial access.

48. The apparatus of claim 46, further comprising:
- means for sending information associated with the first priority and the second priority.

49. The apparatus of claim 48, wherein the information indicates the base station supports at least the first priority and the second priority.

50. The apparatus of claim 48, wherein the information indicates the first duration of the first RAR window and the second duration of the second RAR window.

51. The apparatus of claim 48, wherein the information indicates at least one of a first power-ramping step or a first backoff interval associated with the first RACH procedure, the at least one of the first power-ramping step or the first backoff interval being different from a respective one of a second power-ramping step or a second backoff interval associated with the second RACH procedure.

52. The apparatus of claim 48, wherein at least a portion of the information is sent via broadcast in at least one system information block (SIB).

53. The apparatus of claim 48, wherein at least a portion of the information is sent to the UE via radio resource control (RRC) signaling when the UE is operating in an RRC Connected mode.

54. The apparatus of claim 46, wherein the first RACH procedure comprises a two-step RACH procedure and the second RACH procedure comprises a four-step RACH procedure.

55. A non-transitory computer-readable medium storing computer-executable code for wireless communication by a user equipment (UE), comprising code to:
  generate a payload of a first preamble message associated with a first random access channel (RACH) procedure, wherein the payload indicates a first priority of the first RACH procedure that is relatively higher than a second priority of a second RACH procedure;
  send the first preamble message including a RACH preamble and the payload to a base station, wherein the first preamble message indicates an identifier (ID) of the UE;
  monitor for a first response message in a first random access response (RAR) window and based on the first preamble message, wherein the first RAR window has a shorter duration than a second RAR window associated with the second RACH procedure;
  receive a second response message associated with the second RACH procedure in the second RAR window when the first response message is undetected in the first RAR window and based on the first preamble message, wherein the ID of the UE is unindicated in the second response message; and
  send a radio resource control (RRC) connection request to the base station based on the second response message, wherein the RRC connection request includes information in a physical uplink shared channel (PUSCH); and
  receive a contention resolution message from the base station based on the RRC connection request.

56. A non-transitory computer-readable medium storing computer-executable code for wireless communication by a base station, comprising code to:
  receive a first preamble message of a first random access channel (RACH) procedure from a user equipment (UE), wherein the first preamble message indicates an identifier (ID) of the UE, and wherein a payload of the first preamble message indicates a first priority of a first RACH procedure that is relatively higher than a second priority of a second RACH procedure;
  send a first response message to the UE in a first random access response (RAR) window based on the first preamble message, wherein the first response message indicates the ID of the UE based on the first priority of the first RACH procedure, the first RAR window having a first duration shorter than a second duration of a second RAR window of the second RACH procedure;
  send a second response message associated with the second RACH procedure in the second RAR window based on the first preamble message, wherein the ID of the UE is unindicated in the second response message; and
  receive a radio resource control (RRC) connection request from the UE based on the second response message, wherein the RRC connection request includes information in a physical uplink shared channel (PUSCH); and
  send a contention resolution message to the UE based on the RRC connection request.

* * * * *